United States Patent
Nakamura et al.

(10) Patent No.: US 9,389,601 B2
(45) Date of Patent: Jul. 12, 2016

(54) SUBSTRATE PROCESSING APPARATUS, SUBSTRATE PROCESSING SYSTEM, CONTROL METHOD FOR SUBSTRATE PROCESSING APPARATUS AND STORAGE MEDIUM

(71) Applicant: DAINIPPON SCREEN MFG. CO., LTD., Kyoto-shi, Kyoto (JP)

(72) Inventors: Yasunori Nakamura, Kyoto (JP); Nobuhiko Nakagawa, Kyoto (JP); Naohiko Kawashima, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 462 days.

(21) Appl. No.: 14/061,495

(22) Filed: Oct. 23, 2013

(65) Prior Publication Data

US 2014/0121791 A1 May 1, 2014

(30) Foreign Application Priority Data

Oct. 24, 2012 (JP) .................................. 2012-234578

(51) Int. Cl.
*G06F 17/00* (2006.01)
*G05B 15/02* (2006.01)

(52) U.S. Cl.
CPC *G05B 15/02* (2013.01); *Y02P 90/02* (2015.11)

(58) Field of Classification Search
CPC ................................. G05B 15/02; Y02P 90/02
USPC ............................................................ 700/90
See application file for complete search history.

(56) References Cited

U.S. PATENT DOCUMENTS

| | | | |
|---|---|---|---|
| 6,060,697 A | 5/2000 | Morita et al. | |
| 6,807,452 B2 | 10/2004 | Mukuta et al. | |

(Continued)

FOREIGN PATENT DOCUMENTS

| | | |
|---|---|---|
| CN | 101034285 A | 9/2007 |
| JP | 2003-059891 A | 2/2003 |

(Continued)

OTHER PUBLICATIONS

Office Action Chinese Patent Application No. 201310506626.5 dated Dec. 2, 2015.

(Continued)

*Primary Examiner* — Robert Fennema
*Assistant Examiner* — Sivalingam Sivanesan
(74) *Attorney, Agent, or Firm* — McDermott Will & Emery LLP

(57) ABSTRACT

A substrate processing apparatus includes a plurality of functional sections 200, 300, 400 and 500 each of which is selectively set in an operating state where an assigned processing thereof is executable on a substrate and a standby state where an energy consumption amount is less than in the operating state, and an apparatus controller 50 which controls a state of each functional section 200, 300, 400, 500 between the operating state and the standby state and causes the functional section in charge of the assigned processing corresponding to a recipe to be set in the operating state and perform the assigned processing in executing the recipe specifying a processing procedure on the substrate. If an execution planned recipe, which is the recipe planned to be executed later, is given, the apparatus controller 50 specifies the functional section capable of being in charge of the assigned processing corresponding to the execution planned recipe out of the plurality of functional sections 200, 300, 400 and 500 and obtains a resource consumption amount necessary to recover the specified functional section specified by the specifying operation to the operating state.

29 Claims, 15 Drawing Sheets

(56) References Cited

U.S. PATENT DOCUMENTS

| | | | |
|---|---|---|---|
| 7,681,055 B2 | 3/2010 | Iijima | |
| 2004/0122545 A1* | 6/2004 | Akiyama | G05B 19/41865 700/99 |
| 2007/0213864 A1* | 9/2007 | Iijima | G05B 19/41865 700/121 |
| 2012/0048467 A1 | 3/2012 | Mahadeswaraswamy et al. | |
| 2013/0178971 A1* | 7/2013 | Hashimoto | G05B 19/41865 700/121 |

FOREIGN PATENT DOCUMENTS

| | | |
|---|---|---|
| JP | 2004-200485 A | 7/2004 |
| JP | 2004-267965 A | 9/2004 |
| JP | 2007242854 A | 9/2007 |
| JP | 2008-218449 A | 9/2008 |
| JP | 2010-027772 A | 2/2010 |
| JP | 2012-195446 A | 10/2012 |
| KR | 10-1998-079552 A | 11/1998 |
| KR | 10-2007-0092148 A | 9/2007 |
| WO | 2012/124193 A1 | 9/2012 |

OTHER PUBLICATIONS

Office Action Korean Patent Application No. 10-2013-0104676 dated Feb. 5, 2015.

* cited by examiner

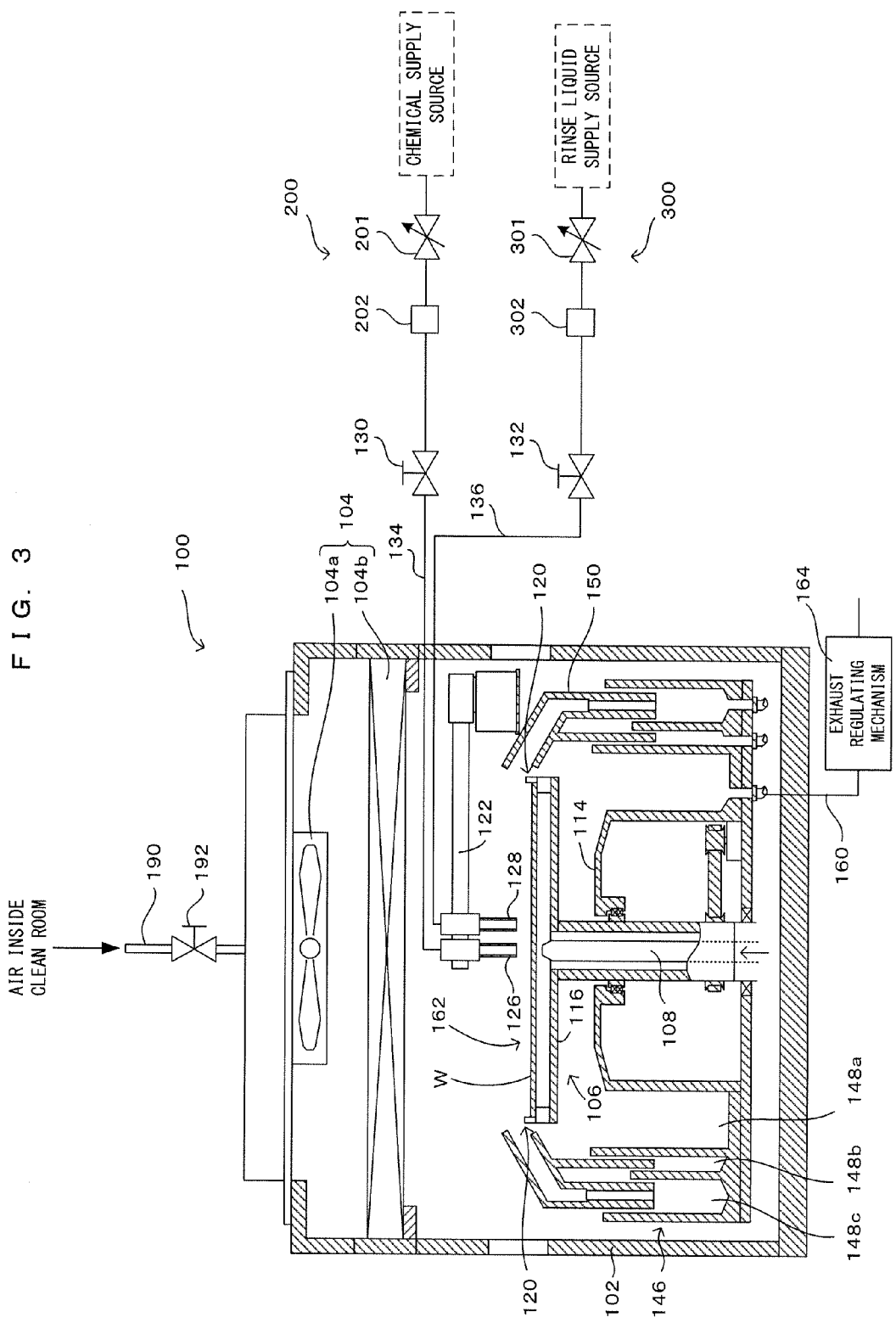

F I G. 5 A

| STEP | OPERATION TIME [SEC] | REVOLUTION OF SPIN BASE [RPM] | NOZZLE ARM | |
|---|---|---|---|---|
| | | | FLOW RATE OF CHEMICAL [l/MIN] | FLOW RATE OF RINSE LIQUID [l/MIN] |
| 1 CHEMICAL PROCESSING | 5 | 800 | 1.5 | — |
| 2 RINSE PROCESSING | 10 | 500 | — | 1.0 |
| 3 DRY PROCESSING | 10 | 1500 | — | — |

F I G. 5 B

| TEMPERATURE OF CHEMICAL [°C] | TEMPERATURE OF RINSE LIQUID [°C] |
|---|---|
| 40 | 60 |

F I G. 6
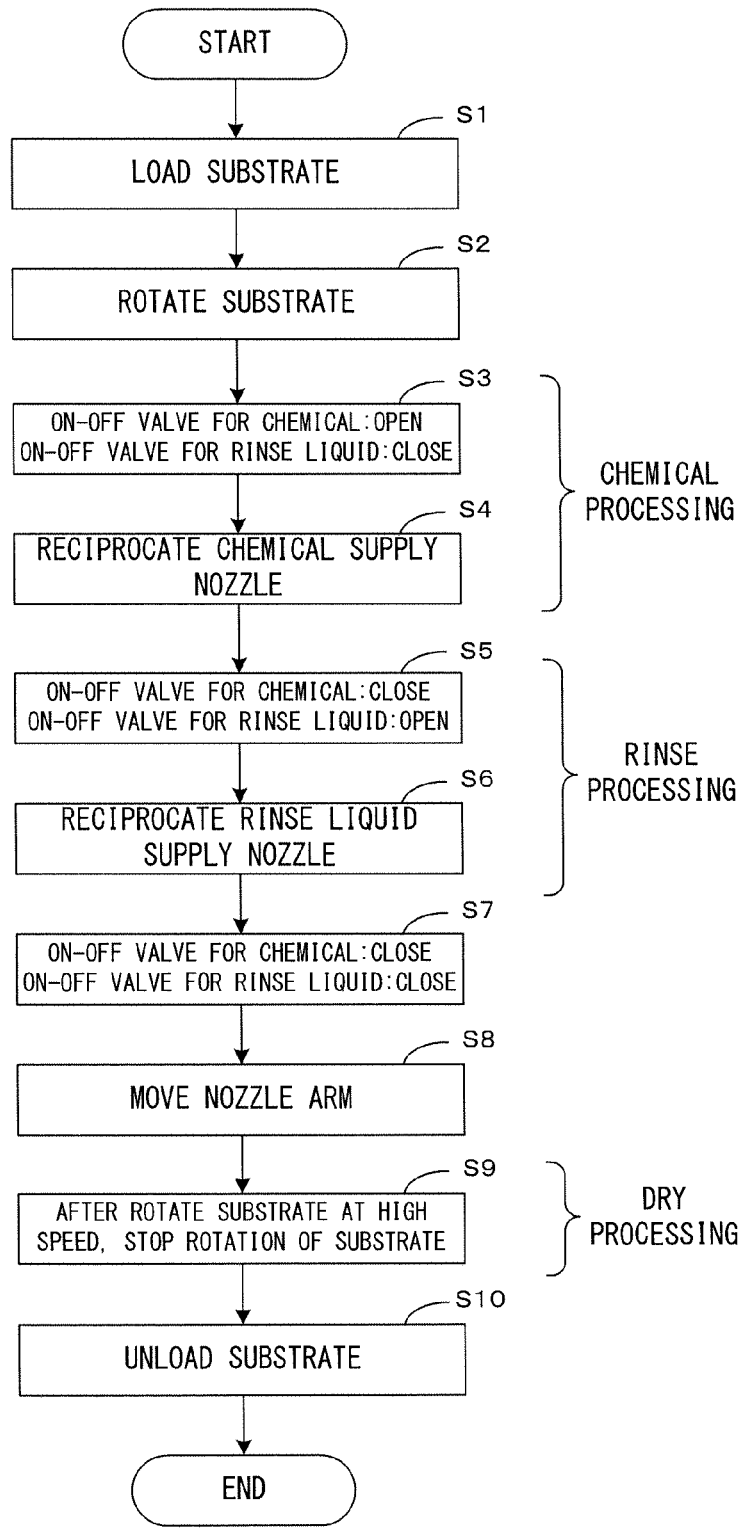

F I G. 8A

| | | OPERATING STATE | STANDBY STATE A | STANDBY STATE B | STANDBY STATE C | STOP STATE |
|---|---|---|---|---|---|---|
| CLEANING UNIT 100A | CHEMICAL PROCESSING SECTION 400 | TRANSITION TIME (→):0m 10s<br>TRANSITION TIME (←):N/A<br>MAINTAIN POWER:2kW<br>DEGREE OF ACTIVITY OF ELECTRICAL COMPONENT:100% | TRANSITION TIME (→):0m 10s<br>TRANSITION TIME (←):0m 20s<br>MAINTAINING POWER:1.5kW<br>DEGREE OF ACTIVITY OF ELECTRICAL COMPONENT:75% | TRANSITION TIME (→):0m 10s<br>TRANSITION TIME (←):0m 30s<br>MAINTAIN POWER:1kW<br>DEGREE OF ACTIVITY OF ELECTRICAL COMPONENT:50% | TRANSITION TIME (→):0m 30s<br>TRANSITION TIME (←):0m 30s<br>MAINTAIN POWER:0.5kW<br>DEGREE OF ACTIVITY OF ELECTRICAL COMPONENT:25% | TRANSITION TIME (→):N/A<br>TRANSITION TIME (←):0m 40s<br>MAINTAIN POWER:0kW<br>DEGREE OF ACTIVITY OF ELECTRICAL COMPONENT:0% |
| | RINSE PROCESSING SECTION 500 | TRANSITION TIME (→):0m 10s<br>TRANSITION TIME (←):N/A<br>MAINTAIN POWER:2kW<br>DEGREE OF ACTIVITY OF ELECTRICAL COMPONENT:100% | TRANSITION TIME (→):0m 10s<br>TRANSITION TIME (←):0m 20s<br>MAINTAINING POWER:1.5kW<br>DEGREE OF ACTIVITY OF ELECTRICAL COMPONENT:75% | TRANSITION TIME (→):0m 20s<br>TRANSITION TIME (←):0m 40s<br>MAINTAIN POWER:1kW<br>DEGREE OF ACTIVITY OF ELECTRICAL COMPONENT:50% | TRANSITION TIME (→):0m 40s<br>TRANSITION TIME (←):0m 40s<br>MAINTAIN POWER:0.5kW<br>DEGREE OF ACTIVITY OF ELECTRICAL COMPONENT:25% | TRANSITION TIME (→):N/A<br>TRANSITION TIME (←):0m 40s<br>MAINTAIN POWER:0kW<br>DEGREE OF ACTIVITY OF ELECTRICAL COMPONENT:0% |
| CLEANING UNIT 100B | CHEMICAL PROCESSING SECTION 400 | TRANSITION TIME (→):0m 10s<br>TRANSITION TIME (←):N/A<br>MAINTAIN POWER:2kW<br>DEGREE OF ACTIVITY OF ELECTRICAL COMPONENT:100% | TRANSITION TIME (→):0m 10s<br>TRANSITION TIME (←):0m 20s<br>MAINTAINING POWER:1.5kW<br>DEGREE OF ACTIVITY OF ELECTRICAL COMPONENT:75% | TRANSITION TIME (→):0m 10s<br>TRANSITION TIME (←):0m 20s<br>MAINTAIN POWER:1kW<br>DEGREE OF ACTIVITY OF ELECTRICAL COMPONENT:50% | TRANSITION TIME (→):0m 30s<br>TRANSITION TIME (←):0m 30s<br>MAINTAIN POWER:0.5kW<br>DEGREE OF ACTIVITY OF ELECTRICAL COMPONENT:25% | TRANSITION TIME (→):N/A<br>TRANSITION TIME (←):0m 40s<br>MAINTAIN POWER:0kW<br>DEGREE OF ACTIVITY OF ELECTRICAL COMPONENT:0% |
| | RINSE PROCESSING SECTION 500 | TRANSITION TIME (→):0m 10s<br>TRANSITION TIME (←):N/A<br>MAINTAIN POWER:2kW<br>DEGREE OF ACTIVITY OF ELECTRICAL COMPONENT:100% | TRANSITION TIME (→):0m 20s<br>TRANSITION TIME (←):0m 20s<br>MAINTAINING POWER:1.5kW<br>DEGREE OF ACTIVITY OF ELECTRICAL COMPONENT:75% | TRANSITION TIME (→):0m 20s<br>TRANSITION TIME (←):0m 40s<br>MAINTAIN POWER:1kW<br>DEGREE OF ACTIVITY OF ELECTRICAL COMPONENT:50% | TRANSITION TIME (→):0m 40s<br>TRANSITION TIME (←):0m 40s<br>MAINTAIN POWER:0.5kW<br>DEGREE OF ACTIVITY OF ELECTRICAL COMPONENT:25% | TRANSITION TIME (→):N/A<br>TRANSITION TIME (←):0m 40s<br>MAINTAIN POWER:0kW<br>DEGREE OF ACTIVITY OF ELECTRICAL COMPONENT:0% |

F I G. 8B

| | STATE A | STATE B | STATE C | STATE D | STOP STATE |
|---|---|---|---|---|---|
| CHEMICAL SUPPLY SECTION 200 | TRANSITION TIME (→):2m 30s<br>TRANSITION TIME (←):N/A<br>MAINTAIN POWER:5kW<br>TEMPERATURE:60°C | TRANSITION TIME (→):1m 30s<br>TRANSITION TIME (←):10m 00s<br>MAINTAIN POWER:3kW<br>TEMPERATURE:50°C | TRANSITION TIME (→):1m 30s<br>TRANSITION TIME (←):15m 00s<br>MAINTAIN POWER:2kW<br>TEMPERATURE:40°C | TRANSITION TIME (→):1m 30s<br>TRANSITION TIME (←):20m 00s<br>MAINTAIN POWER:1kW<br>TEMPERATURE:30°C | TRANSITION TIME (→):N/A<br>TRANSITION TIME (←):30m 00s<br>MAINTAIN POWER:0kW<br>TEMPERATURE:INCONSTANT<br>(ROOM TEMPERATURE) |
| RINSE LIQUID SUPPLY SECTION 300 | TRANSITION TIME (→):10m 00s<br>TRANSITION TIME (←):N/A<br>MAINTAIN POWER:10kW<br>TEMPERATURE:60°C | TRANSITION TIME (→):5m 00s<br>TRANSITION TIME (←):30m 00s<br>MAINTAIN POWER:5kW<br>TEMPERATURE:50°C | TRANSITION TIME (→):2m 30s<br>TRANSITION TIME (←):30m 00s<br>MAINTAIN POWER:3kW<br>TEMPERATURE:40°C | TRANSITION TIME (→):2m 30s<br>TRANSITION TIME (←):30m 00s<br>MAINTAIN POWER:2kW<br>TEMPERATURE:30°C | TRANSITION TIME (→):N/A<br>TRANSITION TIME (←):45m 00s<br>MAINTAIN POWER:0kW<br>TEMPERATURE:INCONSTANT<br>(ROOM TEMPERATURE) |

F I G. 1 0
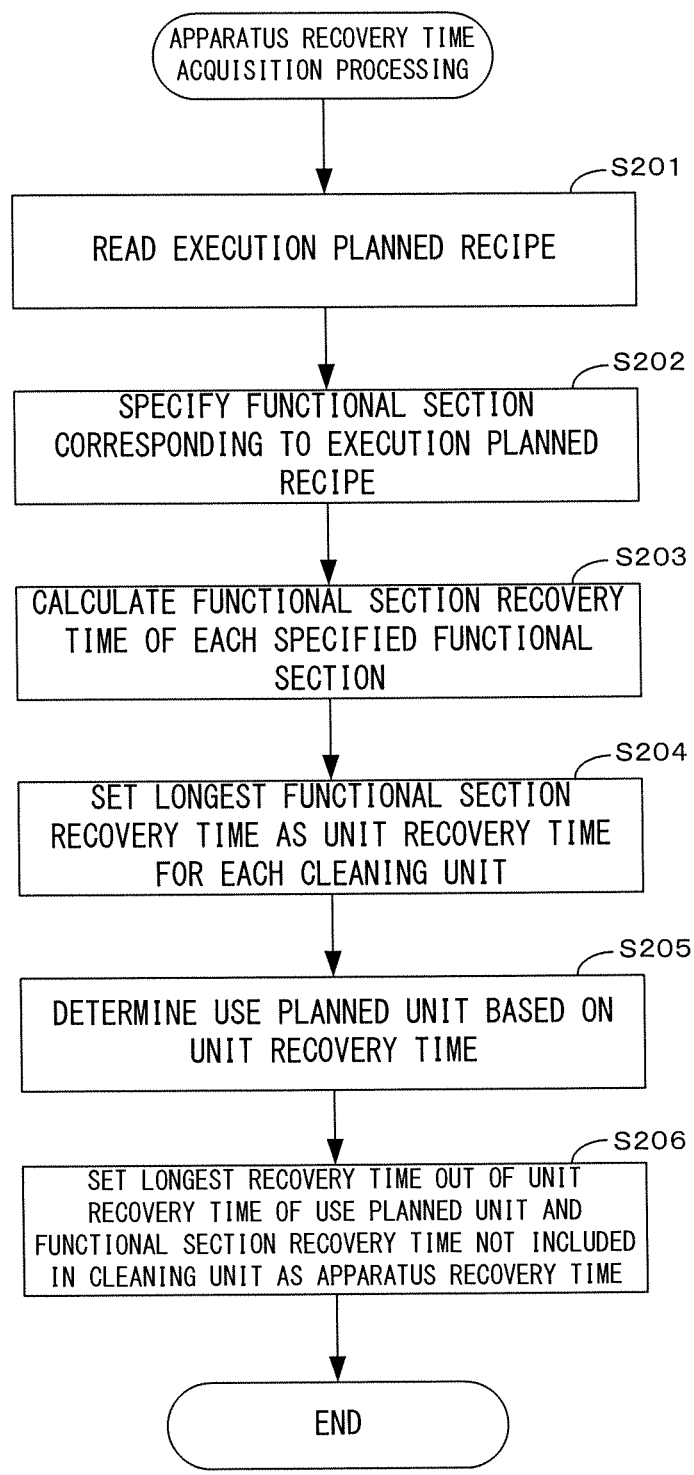

F I G. 11A

| | | OPERATING STATE | STANDBY STATE A | STANDBY STATE B | STANDBY STATE C | STOP STATE |
|---|---|---|---|---|---|---|
| CLEANING UNIT 100A | CHEMICAL PROCESSING SECTION 400 | TRANSITION TIME(→):0m 10s<br>TRANSITION TIME(←):N/A<br>MAINTAIN POWER:2kW<br>DEGREE OF ACTIVITY OF ELECTRICAL COMPONENT:100% | TRANSITION TIME(→):0m 10s<br>TRANSITION TIME(←):0m 20s<br>MAINTAIN POWER:1.5kW<br>DEGREE OF ACTIVITY OF ELECTRICAL COMPONENT:75% | TRANSITION TIME(→):0m 10s<br>TRANSITION TIME(←):0m 30s<br>MAINTAIN POWER:1kW<br>DEGREE OF ACTIVITY OF ELECTRICAL COMPONENT:50% | TRANSITION TIME(→):0m 30s<br>TRANSITION TIME(←):0m 30s<br>MAINTAIN POWER:0.5kW<br>DEGREE OF ACTIVITY OF ELECTRICAL COMPONENT:25% | TRANSITION TIME(→):N/A<br>TRANSITION TIME(←):0m 40s<br>MAINTAIN POWER:0kW<br>DEGREE OF ACTIVITY OF ELECTRICAL COMPONENT:0% |
| | RINSE PROCESSING SECTION 500 | TRANSITION TIME(→):0m 10s<br>TRANSITION TIME(←):N/A<br>MAINTAIN POWER:2kW<br>DEGREE OF ACTIVITY OF ELECTRICAL COMPONENT:100% | TRANSITION TIME(→):0m 10s<br>TRANSITION TIME(←):0m 20s<br>MAINTAIN POWER:1.5kW<br>DEGREE OF ACTIVITY OF ELECTRICAL COMPONENT:75% | TRANSITION TIME(→):0m 20s<br>TRANSITION TIME(←):0m 40s<br>MAINTAIN POWER:1kW<br>DEGREE OF ACTIVITY OF ELECTRICAL COMPONENT:50% | TRANSITION TIME(→):0m 40s<br>TRANSITION TIME(←):0m 40s<br>MAINTAIN POWER:0.5kW<br>DEGREE OF ACTIVITY OF ELECTRICAL COMPONENT:25% | TRANSITION TIME(→):N/A<br>TRANSITION TIME(←):0m 40s<br>MAINTAIN POWER:0kW<br>DEGREE OF ACTIVITY OF ELECTRICAL COMPONENT:0% |
| CLEANING UNIT 100B | CHEMICAL PROCESSING SECTION 400 | TRANSITION TIME(→):0m 10s<br>TRANSITION TIME(←):N/A<br>MAINTAIN POWER:2kW<br>DEGREE OF ACTIVITY OF ELECTRICAL COMPONENT:100% | TRANSITION TIME(→):0m 10s<br>TRANSITION TIME(←):0m 20s<br>MAINTAIN POWER:1.5kW<br>DEGREE OF ACTIVITY OF ELECTRICAL COMPONENT:75% | TRANSITION TIME(→):0m 10s<br>TRANSITION TIME(←):0m 30s<br>MAINTAIN POWER:1kW<br>DEGREE OF ACTIVITY OF ELECTRICAL COMPONENT:50% | TRANSITION TIME(→):0m 30s<br>TRANSITION TIME(←):0m 30s<br>MAINTAIN POWER:0.5kW<br>DEGREE OF ACTIVITY OF ELECTRICAL COMPONENT:25% | TRANSITION TIME(→):N/A<br>TRANSITION TIME(←):0m 40s<br>MAINTAIN POWER:0kW<br>DEGREE OF ACTIVITY OF ELECTRICAL COMPONENT:0% |
| | RINSE PROCESSING SECTION 500 | TRANSITION TIME(→):0m 10s<br>TRANSITION TIME(←):N/A<br>MAINTAIN POWER:2kW<br>DEGREE OF ACTIVITY OF ELECTRICAL COMPONENT:100% | TRANSITION TIME(→):0m 20s<br>TRANSITION TIME(←):0m 20s<br>MAINTAIN POWER:1.5kW<br>DEGREE OF ACTIVITY OF ELECTRICAL COMPONENT:75% | TRANSITION TIME(→):0m 20s<br>TRANSITION TIME(←):0m 40s<br>MAINTAIN POWER:1kW<br>DEGREE OF ACTIVITY OF ELECTRICAL COMPONENT:50% | TRANSITION TIME(→):0m 40s<br>TRANSITION TIME(←):0m 40s<br>MAINTAIN POWER:0.5kW<br>DEGREE OF ACTIVITY OF ELECTRICAL COMPONENT:25% | TRANSITION TIME(→):N/A<br>TRANSITION TIME(←):0m 40s<br>MAINTAIN POWER:0kW<br>DEGREE OF ACTIVITY OF ELECTRICAL COMPONENT:0% |

F I G. 11B

| | STATE A | STATE B | STATE C | STATE D | STOP STATE |
|---|---|---|---|---|---|
| CHEMICAL SUPPLY SECTION 200 | TRANSITION TIME(→):2m 30s<br>TRANSITION TIME(←):N/A<br>MAINTAIN POWER:5kW<br>TEMPERATURE:60°C | TRANSITION TIME(→):1m 30s<br>TRANSITION TIME(←):10m 00s<br>MAINTAIN POWER:3kW<br>TEMPERATURE:50°C | TRANSITION TIME(→):1m 30s<br>TRANSITION TIME(←):15m 00s<br>MAINTAIN POWER:2kW<br>TEMPERATURE:40°C | TRANSITION TIME(→):1m 30s<br>TRANSITION TIME(←):20m 00s<br>MAINTAIN POWER:1kW<br>TEMPERATURE:30°C | TRANSITION TIME(→):N/A<br>TRANSITION TIME(←):30m 00s<br>MAINTAIN POWER:0kW<br>TEMPERATURE:INCONSTANT<br>(ROOM TEMPERATURE) |
| RINSE LIQUID SUPPLY SECTION 300 | TRANSITION TIME(→):10m 00s<br>TRANSITION TIME(←):N/A<br>MAINTAIN POWER:10kW<br>TEMPERATURE:60°C | TRANSITION TIME(→):5m 00s<br>TRANSITION TIME(←):30m 00s<br>MAINTAIN POWER:5kW<br>TEMPERATURE:50°C | TRANSITION TIME(→):2m 30s<br>TRANSITION TIME(←):30m 00s<br>MAINTAIN POWER:3kW<br>TEMPERATURE:40°C | TRANSITION TIME(→):2m 30s<br>TRANSITION TIME(←):30m 00s<br>MAINTAIN POWER:2kW<br>TEMPERATURE:30°C | TRANSITION TIME(→):N/A<br>TRANSITION TIME(←):45m 00s<br>MAINTAIN POWER:0kW<br>TEMPERATURE:INCONSTANT<br>(ROOM TEMPERATURE) |

F I G. 1 2

| SPECIFIED FUNCTIONAL SECTION | | FUNCTIONAL SECTION RECOVERY TIME | UNIT RECOVERY TIME | UNIT RECOVERY TIME OF USE PLANNED UNIT | APPARATUS RECOVERY TIME |
|---|---|---|---|---|---|
| CLEANING UNIT 100A | CHEMICAL PROCESSING SECTION 400 | 50sec (=30sec+20sec) | 1min40sec (=max(50sec, 1min40sec)) | 1min (=min(1min40sec, 1min)) | 1h (=max(1min, 50min, 1h)) |
| | RINSE PROCESSING SECTION 500 | 1min40sec (=40sec+40sec+20sec) | | | |
| CLEANING UNIT 100B | CHEMICAL PROCESSING SECTION 400 | 20sec | 1min (=max(20sec, 1min)) | | |
| | RINSE PROCESSING SECTION 500 | 1min (=40sec+20sec) | | | |
| CHEMICAL SUPPLY SECTION 200 | | 50min (=30min+20min) | — | — | |
| RINSE LIQUID SUPPLY SECTION 300 | | 1h (=30min+30min) | — | — | |

F I G. 1 5

| SPECIFIED FUNCTIONAL SECTION | | FUNCTIONAL SECTION RECOVERY POWER AMOUNT | UNIT RECOVERY POWER AMOUNT | UNIT RECOVERY POWER AMOUNT OF USE PLANNED UNIT | APPARATUS RECOVERY POWER AMOUNT |
|---|---|---|---|---|---|
| CLEANING UNIT 100A | CHEMICAL PROCESSING SECTION 400 | 1.006kWh | 1.524kWh (=1.006+0.518) | 1.524kWh (=min(1.524, 2.509)) | 8.024kWh (=1.524+0.750+5.750) |
| | RINSE PROCESSING SECTION 500 | 0.518kWh | | | |
| CLEANING UNIT 100B | CHEMICAL PROCESSING SECTION 400 | 1.502kWh | 2.509kWh (=1.502+1.007) | | |
| | RINSE PROCESSING SECTION 500 | 1.007kWh | | | |
| CHEMICAL SUPPLY SECTION 200 | | 0.750kWh | — | — | |
| RINSE LIQUID SUPPLY SECTION 300 | | 5.750kWh | — | — | |

SUBSTRATE PROCESSING APPARATUS, SUBSTRATE PROCESSING SYSTEM, CONTROL METHOD FOR SUBSTRATE PROCESSING APPARATUS AND STORAGE MEDIUM

CROSS REFERENCE TO RELATED APPLICATION

The disclosure of Japanese Patent Applications enumerated below including specification, drawings and claims is incorporated herein by reference in its entirety:
No. 2012-234578 filed Oct. 24, 2012.

BACKGROUND OF THE INVENTION

1. Field of the Invention

This invention relates to a technology for processing a substrate using a plurality of functional sections each for performing an assigned processing on a substrate and particularly to a technology for controlling states of functional sections between an operating state where an assigned processing is executable and a standby state where an energy consumption amount is less than in the operating state.

2. Description of the Related Art

JP2007-242854A discloses a substrate processing apparatus including a processing chamber in which a substrate is to be processed and a plurality of units for adjusting an internal state of the processing chamber. Further, these units can be set in a normal mode where a substrate can be processed and an energy saving mode in which energy consumption is saved more than in the normal mode. Thus, it is possible to suppress unnecessary consumption of energy by appropriately setting the units in the energy saving mode while no substrate is processed and, on the other hand, recovering the units to the normal mode in processing a substrate. Further, in this substrate processing apparatus, a recovery time required to recover each unit from the energy saving mode to the normal mode is stored in a database in advance. A recovery of each unit is started, allowing the recovery time stored in the database. This optimizes a timing of adjusting the internal state of the processing chamber.

SUMMARY OF THE INVENTION

In the substrate processing apparatus for controlling each functional section for processing a substrate between an operating state (normal mode) and a standby state (energy saving mode), it is important for appropriate management associated with substrate processing to accurately grasp the consumption amount of resource such as a time required to recover each functional section to the operating state. However, generally in a substrate processing apparatus, a substrate is processed by each functional section operating in accordance with a recipe specifying a processing procedure. Thus, use states of the functional sections differ depending on the content of a recipe planned to be executed and the amount of resource to be consumed for the recovery also differ. On the other hand, with a control of patent literature 1, it has been far from sufficient to accurately obtain the amount of resource required for the recovery in conformity with the content of a recipe planned to be executed.

An advantage of some aspects of the invention is, in a substrate processing technology for processing a substrate using a plurality of functional sections settable in an operating state and a standby state, to accurately obtain the amount of resource to be consumed to recover the functional sections to the operating state in conformity with the content of a recipe planned to be executed and to make management associated with substrate processing appropriately executable.

According to a first aspect of the invention, there is provided a substrate processing apparatus, comprising: a plurality of functional sections each of which is selectively set in an operating state where an assigned processing thereof is executable on a substrate and a standby state where an energy consumption amount is less than in the operating state; a controller which controls a state of each functional section between the operating state and the standby state and causes the functional section in charge of the assigned processing corresponding to a recipe to be set in the operating state and perform the assigned processing in executing the recipe specifying a processing procedure on the substrate; and a resource consumption amount acquisition section which performs a specifying operation of specifying the functional section capable of being in charge of the assigned processing corresponding to an execution planned recipe out of the plurality of functional sections and obtains a resource consumption amount necessary to recover the specified functional section specified by the specifying operation to the operating state if the execution planned recipe, which is the recipe planned to be executed later, is given.

According to a second aspect of the invention, there is provided a substrate processing system with a plurality of substrate processing apparatuses, comprising: an information acquisition device which obtains a parameter used for a control of the plurality of substrate processing apparatuses, wherein: each of the substrate processing apparatuses includes: a plurality of functional sections each of which is selectively set in an operating state where an assigned processing thereof is executable on a substrate and a standby state where an energy consumption amount is less than in the operating state, and a controller which controls a state of each functional section between the operating state and the standby state and causes the functional section in charge of the assigned processing corresponding to a recipe to be set in the operating state and perform the assigned processing in executing the recipe specifying a processing procedure on the substrate; and the information acquisition device performs a specifying operation of specifying the functional section capable of being in charge of the assigned processing corresponding to an execution planned recipe, which is the recipe to be executed later, out of the plurality of functional sections, and obtains a resource consumption amount necessary to recover the specified functional section specified by the specifying operation to the operating state as the parameter for each substrate processing apparatus.

According to a third aspect of the invention, there is provided a control method for a substrate processing apparatus which includes a plurality of functional sections each of which is selectively set in an operating state where an assigned processing thereof is executable on a substrate and a standby state where an energy consumption amount is less than in the operating state and selects a state of each functional section between the operating state and the standby state, comprising: reading a recipe specifying a processing procedure on the substrate; performing a specifying operation of specifying the functional section capable of being in charge of the assigned processing corresponding to an execution planned recipe out of the plurality of functional sections if the execution planned recipe, which is the recipe planned to be executed later, is given; and obtaining a resource consumption amount necessary to recover the specified functional section specified by the specifying operation to the operating state.

According to a forth aspect of the invention, there is provided a computer-readable storage medium storing a program to be executed by a computer of a substrate processing apparatus which includes a plurality of functional sections each of which is selectively set in an operating state where an assigned processing thereof is executable on a substrate and a standby state where an energy consumption amount is less than in the operating state and selects a state of each functional section between the operating state and the standby state, the program causing the computer to perform: reading a recipe specifying a processing procedure on the substrate; performing a specifying operation of specifying the functional section capable of being in charge of the assigned processing corresponding to an execution planned recipe out of the plurality of functional sections if the execution planned recipe, which is the recipe planned to be executed later, is given; and obtaining a resource consumption amount necessary to recover the specified functional section specified by the specifying operation to the operating state.

In the substrate processing apparatus according to these aspects of the invention (substrate processing apparatus, substrate processing system, control method for substrate processing apparatus and storage medium) configured as described above, the plurality of functional sections are provided each of which can perform the assigned processing on the substrate. These functional sections can be selectively set in the operating state where the assigned processing can be performed and the standby state where an energy consumption amount is less than in the operating state. The functional sections in charge of the assigned processing corresponding to the recipe perform the assigned processing, whereby the processing procedure specified by the recipe is performed on the substrate. Particularly, in these aspects of the invention, if the execution planned recipe, which is the recipe planned to be executed later, is given, the specifying operation of specifying the functional section capable of performing the assigned processing corresponding to this execution planned recipe out of the plurality of functional sections is performed. Then, the resource consumption amount necessary to recover the specified functional section specified by the specifying operation to the operating state is obtained. Management associated with substrate processing can be properly conducted by accurately obtaining the amount of resource to be consumed to recover the functional section capable of performing the assigned processing to the operating state in conformity with the content of the recipe in this way. Note that the "resource" in the invention is a concept including every resource such as time, power and other energy, chemical, air and other substances.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 3 is a diagram showing the cleaning unit 100.

FIG. 5A is a table showing an example of the content of a recipe.

FIG. 5B is a table showing an example of the content of a recipe.

FIG. 6 is a flow chart showing the flow of the substrate processing based on the recipe of FIGS. 5A and 5B.

FIG. 8A is a table showing an example of a database relating to the resource consumption amount.

FIG. 8B is a table showing an example of a database relating to the resource consumption amount.

FIG. 10 is a flow chart showing the apparatus recovery time acquisition processing, FIG. 11A is a table showing the operating state and the current state of each functional section.

FIG. 11B is a table showing the operating state and the current state of each functional section.

FIG. 12 is a table showing a specific example of the apparatus recovery time acquisition processing.

FIG. 15 is a table showing a specific example of the apparatus recovery electric energy acquisition processing.

DETAILED DESCRIPTION OF THE PREFERRED EMBODIMENTS

First Embodiment

Figure 1:
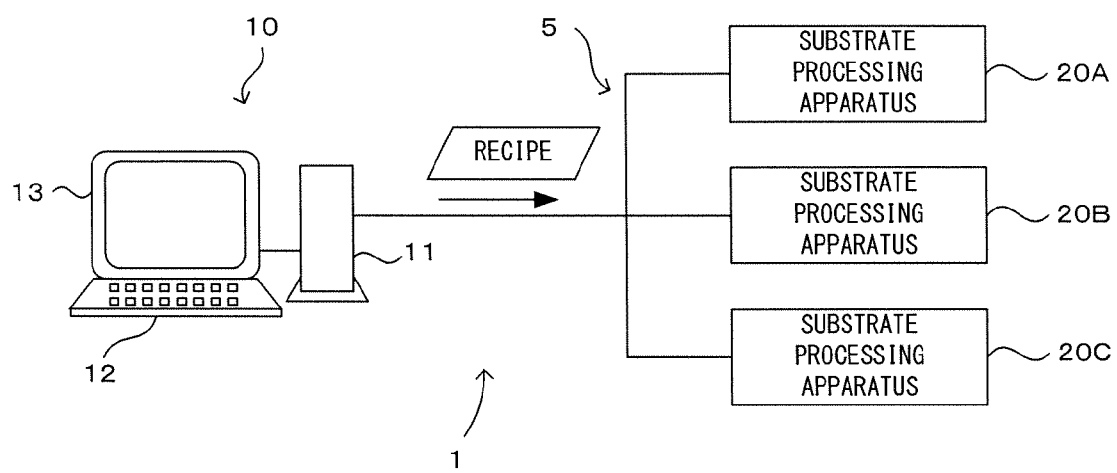
FIG. 1 is a diagram showing one embodiment of a substrate processing system according to an aspect of the invention.

Hereinafter, a first embodiment of a substrate processing system including substrate processing apparatuses to which the invention is applicable is described. FIG. 1 is a diagram showing one embodiment of a substrate processing system according to an aspect of the invention. The substrate processing system 1 according to this embodiment includes a host computer 10 and three substrate processing apparatuses 20A, 20B and 20C. The host computer 10 includes a host controller 11 for performing various controls and processing, an operation section 12 for inputting a command to the host controller 11, and a display section 13 for displaying various pieces of information based on a command from the host controller 11. The host computer 10 and the respective substrate processing apparatuses 20A, 20B and 20C are connected via a network 5 and configured to be communicable with each other. By transmitting a recipe specifying a substrate processing procedure from the host computer 10 to the respective substrate processing apparatuses 20A, 20B and 20C, the respective substrate processing apparatuses 20A, 20B and 20C can be caused to perform processing specified in the recipe. Note that, in this embodiment, it is assumed that all the three substrate processing apparatuses 20A, 20B and 20C have the same configuration and are written merely as the substrate processing apparatuses 20 in the following description unless being particularly distinguished.

Figure 2A:
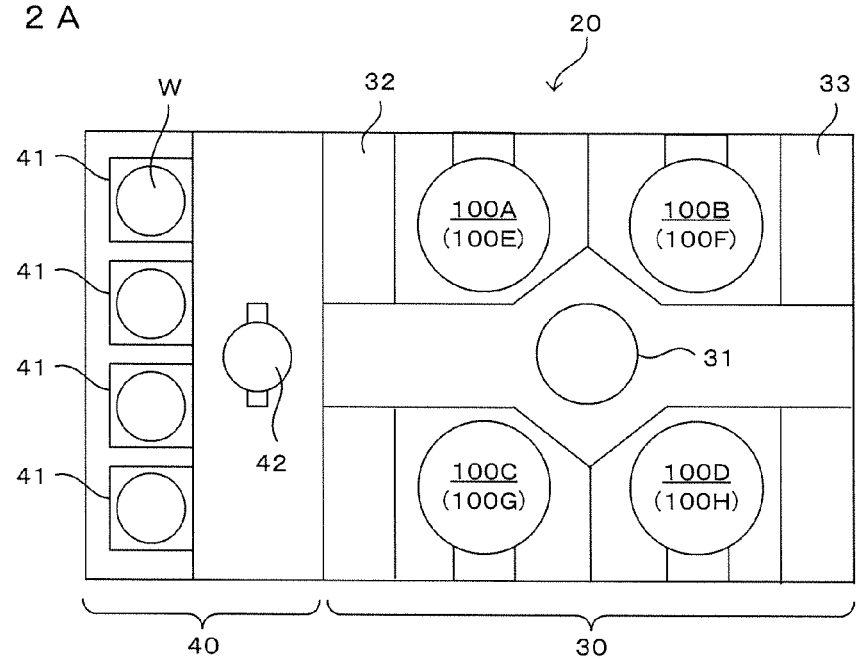
FIG. 2A is a diagram showing the substrate processing apparatus used in the substrate processing system 1 of FIG. 1.
Figure 2B:
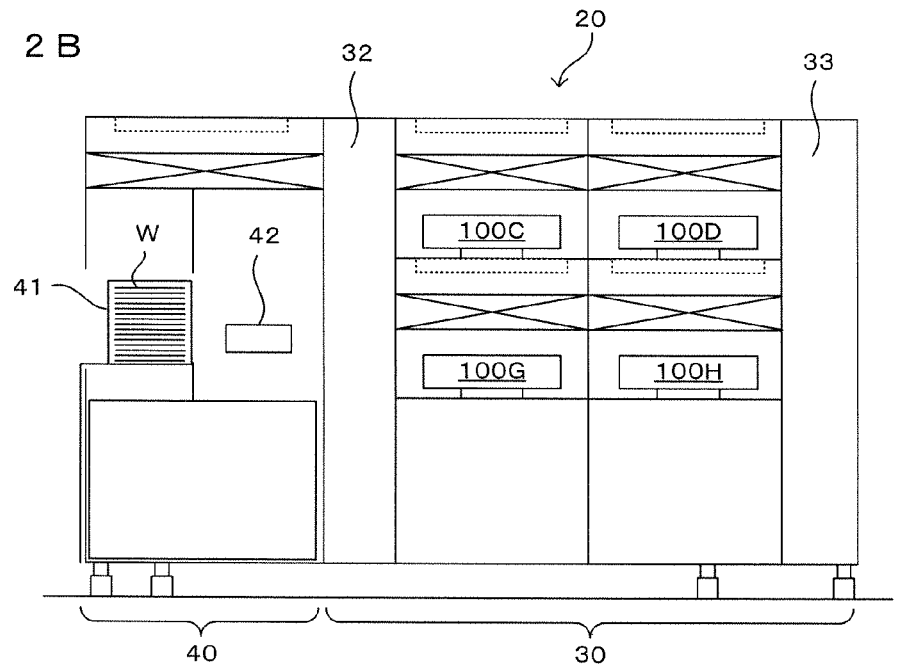
FIG. 2B is a diagrams showing the substrate processing apparatus used in the substrate processing system 1 of FIG. 1.

FIGS. 2A and 2B are diagrams showing the substrate processing apparatus used in the substrate processing system 1 of FIG. 1. More specifically, FIG. 2A is a top view of the substrate processing apparatus and FIG. 2B is a side view of the substrate processing apparatus. This substrate processing apparatus 20 is an apparatus including a plurality of single wafer cleaning units for cleaning a disk-like substrate W such as a semiconductor wafer using treatment liquid. The substrate processing apparatus 20 includes a substrate processing section 30 for processing the substrate W and an indexer section 40 connected to this substrate processing section 30.

The indexer section 40 includes a plurality of (four in this embodiment) cassettes 41 for storing substrates W and an indexer robot 42 capable of accessing the cassettes 41 and transferring the substrates W. Specifically, the indexer robot 42 can take out the pre-processed substrates W from the cassette 41 and stores the processed substrates W into the cassette 41. FOUPs (Front Opening Unified Pods), SMIF (Standard Mechanical Interface) pods, OCs (open cassettes) and the like for storing a plurality of substrates W in a sealed state can be used as the cassettes 41.

In each cassette 41, a plurality of shelves (not shown) are provided at small intervals in a vertical direction so as to be able to store a plurality of substrates W, and the plurality of substrates W are stored on a "lot" basis. The substrates W to be processed in accordance with a given recipe are conveyed to the indexer section 40 on a lot basis. In the substrate processing apparatus 20, the same type of processing is applied to each substrate W constituting the lot.

The indexer robot 42 takes out the pre-processed substrates W from the cassette 41 designated by a controller of the substrate processing apparatus 20 and transfers them to a substrate conveying robot 31 to be described later, and receives the processed substrates W from the substrate conveying robot 31 and stores them into the cassette 41. The processed substrates W may be stored into the cassette 41 in which these substrates W were stored in a pre-processed state or may be stored into the cassette 41 different from the one in which they were stored in the pre-processed state.

The substrate processing section 30 includes the substrate conveying robot 31 arranged substantially in the center in a plan view, a plurality of (four in this embodiment) cleaning units 100A to 100D installed to horizontally surround this substrate conveying robot 31, and treatment fluid boxes 32, 33 each housing a configuration for supplying/discharging processing fluid such as treatment liquid and processing gas. Further, as shown in FIG. 2B, other cleaning units 100E to 100H are installed below the respective cleaning units 100A to 100D, employing a vertical two-stage stacking structure. Note that, in this embodiment, all the cleaning units 100A to 100H apply the same type of processing to the substrates W and are written merely as the cleaning unit 100 in the following description unless being particularly distinguished.

The substrate conveying robot 31 includes a substrate holding hand (not shown) movable back and forth from a robot main body. By orienting the substrate holding hand toward any of the indexer robot 42 and the cleaning units 100A to 100H and moving the substrate holding hand back and forth in that state, the substrate W can be transferred between the substrate conveying robot 31 and any of the indexer robot 42 and the cleaning unit 100A to 100H.

Figure 4:
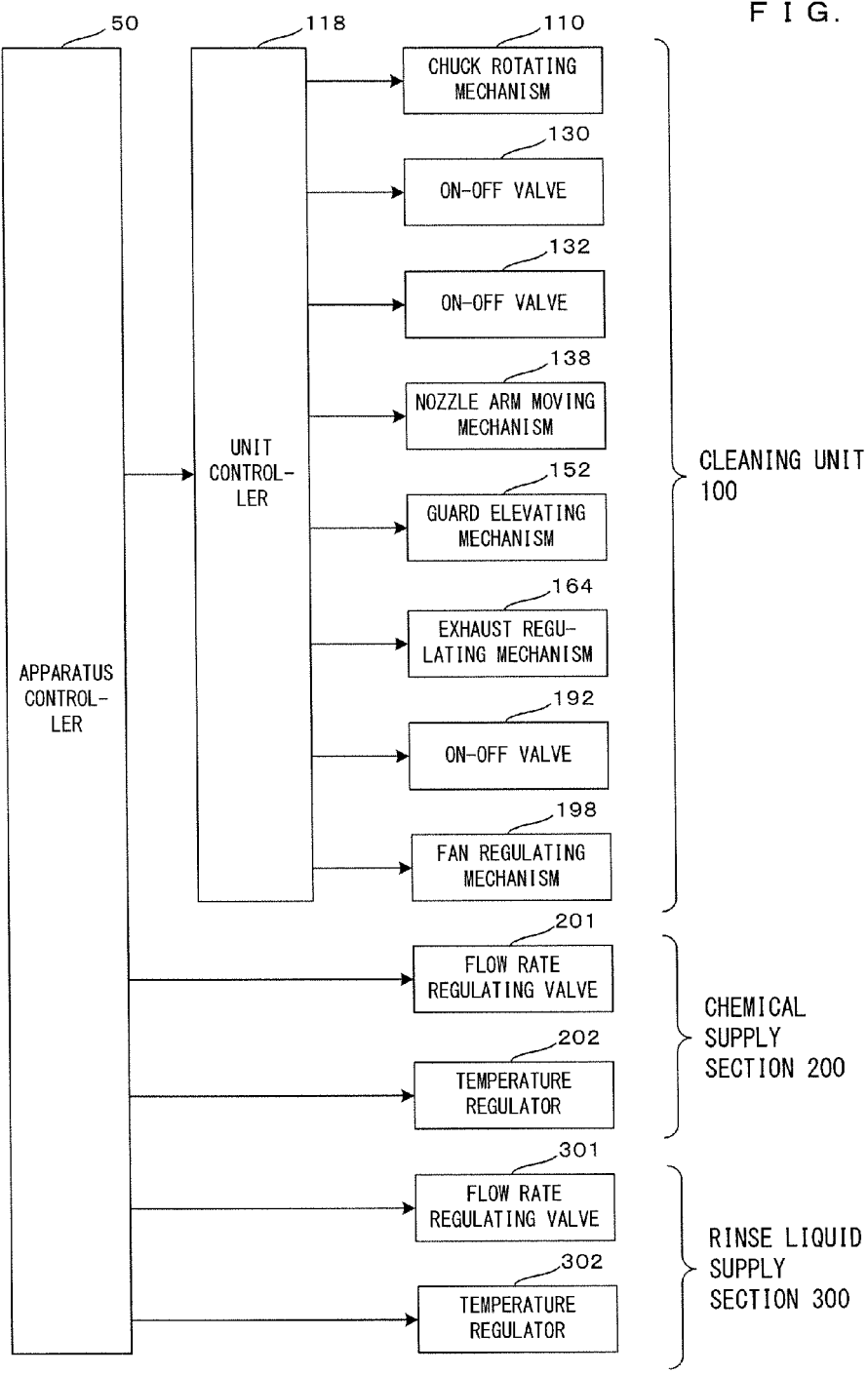
FIG. 4 is a block diagram showing the electrical configuration of the substrate processing apparatus of FIGS. 2A and 2B.

Next, the configurations of the cleaning unit 100, a chemical supply section 200 and a rinse liquid supply section 300 mounted in the substrate processing apparatus 20 are described. FIG. 3 is a diagram showing the cleaning unit 100, the chemical supply section 200 and the rinse liquid supply section 300 mounted in the substrate processing apparatus 20 of FIGS. 2A and 2B and FIG. 4 is a block diagram showing the electrical configuration of the substrate processing apparatus of FIGS. 2A and 2B. The cleaning unit 100 in this embodiment can apply a chemical processing by supplying a chemical such as hydrofluoric acid to the top surface of the substrate W from the chemical supply section 200 and a rinse processing by supplying rinse liquid such as pure water or DIW (deionized water) from the rinse liquid supply section 300.

In this cleaning unit 100, a fan filter unit (FFU) 104 is arranged on a ceiling part of a chamber 102. This fan filter unit 104 includes a fan 104a and a filter 104b. In this embodiment, a supply pipe 190 for supplying clean air is connected to the fan filter unit 104 and an on-off valve 192 for switching whether or not to introduce the clean air to the chamber 102 is disposed in this supply pipe 190. Thus, by opening the on-off valve 192 in response to an operation command from a unit controller 118 (FIG. 4) for controlling the entire cleaning unit 100, the amount of the clean air corresponding to the rotating speed of the fan 104a can be supplied to the fan filter unit 104. On the other hand, by closing the on-off valve 192, the supply of the clean air to the fan filter unit 104 is restricted.

In this fan filter unit 104, gas fed in as described above is fed toward the filter 104b by the fan 104a and fed into a central space of the chamber 102 after being cleaned by the filter 104b. In this embodiment, the fan 104a is connected to a fan regulating mechanism 198 (FIG. 4), and the fan regulating mechanism 198 drives and controls the fan 104a in response to an operation command from the unit controller 118, whereby the amount of gas supplied from the fan filter unit 104 into the central space of the chamber 102 can be controlled.

A spin chuck 106 is arranged in the central space of the chamber 102. This spin chuck 106 is for holding and rotating the substrate W substantially in a horizontal posture with the substrate top surface faced up. Further, in this spin chuck 106, a rotation support shaft 108 is coupled to a rotary shaft of a chuck rotating mechanism 110 (FIG. 4) including a motor and the spin chuck 106 is rotatable about the rotary shaft (vertical axis) by being driven by the chuck rotating mechanism 110. These rotation support shaft 108 and chuck rotating mechanism 110 are housed in a cylindrical casing 114. Further, a disk-like spin base 116 is integrally coupled to an upper end part of the rotation support shaft 108 by a fastening part such as a screw. Thus, by driving the chuck rotating mechanism 110 in response to an operation command from the unit controller 118, the spin base 116 rotates about the rotary shaft. Further, the unit controller 118 adjusts the rotating speed of the spin base 116 by controlling the chuck rotating mechanism 110.

A plurality of chuck pins 120 for gripping a peripheral edge part of the substrate W stand near a peripheral edge part of the spin base 116. It is sufficient to provide three or more chuck pins 120 to reliably hold the circular substrate W and the chuck pins 12 are arranged at equal angular intervals along the peripheral edge part of the spin base 116. Each of the chuck pins 120 includes a substrate supporting section for supporting the peripheral edge part of the substrate W from below and a substrate holding section for holding the substrate W by pressing the outer peripheral end surface of the substrate W supported on the substrate supporting section. Further, each chuck pin 120 is configured to be switchable between a pressing state where the substrate holding section presses the outer peripheral end surface of the substrate W and a released state where the substrate holding section is separated from the outer peripheral end surface of the substrate W.

The plurality of chuck pins 120 are set in the released state when the substrate W is transferred to the spin base 116 while being set in the pressing state when the substrate W is processed. By setting the pressing state in this way, the plurality of chuck pins 120 can grip the peripheral edge part of the substrate W and hold this substrate W substantially in the horizontal posture at a predetermined distance from the spin base 116. This causes the substrate W to be supported with the top surface thereof faced up and the under surface thereof faced down. Note that the substrate holding mechanism is not limited to the chuck pins 120 and a vacuum chuck for holding the substrate W by sucking the substrate under surface may be used.

A nozzle arm 122 is provided pivotally in a horizontal plane at a position above the substrate W held by the spin chuck 106. A chemical supply nozzle 126 and a rinse liquid supply nozzle 128 are attached to a tip part of this nozzle arm 122. Out of these, the chemical supply nozzle 126 is connected to the chemical supply section 200 provided in the processing fluid box 32 (FIGS. 2A and 2B) outside the cleaning unit 100. This chemical supply section 200 can supply chemical suitable for substrate cleaning such as hydrofluoric acid to the nozzle 126. More specifically, the chemical supply section 200 includes a flow rate regulating valve 201 capable of regulating the supply amount of the chemical supplied from a chemical supply source storing the chemical to the chemical supply nozzle 126 and a temperature regulator 202 for regulating the temperature of the chemical, the flow rate of which is regulated by the flow rate regulating valve 201. Further, an on-off valve 130 is disposed in a pipe 134 connecting the chemical supply nozzle 126 and the chemical supply section 200. Thus, by opening the on-off valve 130 in response to an operation command from the unit controller 118, the chemical with the regulated flow rate and temperature is fed under pressure from the chemical supply section 200 to the chemical supply nozzle 126, whereby the chemical is supplied to the top surface of the substrate W. On the other hand, the supply of the chemical to the substrate W is restricted by closing the on-off valve 130.

Further, the rinse liquid supply nozzle 128 is connected to the rinse liquid supply section 300 provided in the processing fluid box 33 (FIGS. 2A and 2B) outside the cleaning unit 100. This rinse liquid supply section 300 can supply the rinse liquid such as pure water or DIW to the nozzle 128. More specifically, the rinse liquid supply section 300 includes a flow rate regulating valve 301 capable of regulating the supply amount of the rinse liquid supplied from a rinse liquid supply source storing the rinse liquid to the rinse liquid supply nozzle 128 and a temperature regulator 302 for regulating the temperature of the rinse liquid, the flow rate of which is regulated by the flow rate regulating valve 301. Further, an on-off valve 132 is disposed in a pipe 136 connecting the rinse liquid supply nozzle 128 and the rinse liquid supply section 300. Thus, by opening the on-off valve 132 in response to an operation command from the unit controller 118, the rinse liquid with the regulated flow rate and temperature is fed under pressure from the rinse liquid supply section 300 to the rinse liquid supply nozzle 128, whereby the rinse liquid is supplied to the top surface of the substrate W. On the other hand, the supply of the rinse liquid to the substrate W is restricted by closing the on-off valve 132.

Note that the chemical supply source and the rinse liquid supply source may be both provided in the substrate processing apparatus 20 or supply sources provided in a factory where the substrate processing system 1 of FIG. 1 is installed may be utilized. Further, the configurations of the chemical supply section 200 and the rinse liquid supply section 300 are not limited to the above ones. For example, in the case of producing the chemical or the rinse liquid by blending a plurality of kinds of liquids, a blender for blending the plurality of kinds of liquids may be further provided.

A nozzle arm moving mechanism 138 (FIG. 4) such as a motor is connected to the nozzle arm 122 to which the chemical supply nozzle 126 and the rinse liquid supply nozzle 128 are attached. The nozzle arm moving mechanism 138 operates in response to an operation command from the unit controller 118, whereby the nozzles 126, 128 are movable between a discharge area above the top surface of the substrate W and a standby position retracted laterally from the discharge area. Further, also in the discharge area, the nozzles 126, 128 are reciprocally movable between positions above the central part and the peripheral edge part of the substrate top surface by the nozzle arm moving mechanism 138.

A receiving member 146 is fixedly mounted around the casing 114. Three cylindrical partitioning members stand on this receiving member 146. Three spaces are formed as drainage tanks 148a to 148c by the combination of these partitioning members and the casing 114. Further, a splash guard 150 is provided above these drainage tanks 148a to 148c movably upward and downward along the rotary shaft of the spin chuck 106 to surround the substrate W held in the horizontal posture by the spin chuck 106. This splash guard 150 is shaped substantially rotationally symmetrically with respect to the rotary shaft and includes two guards arranged concentrically with the spin chuck 106. A guard elevating mechanism 152 (FIG. 4) moves the splash guard 150 upward and downward stepwise in response to an operation command from the unit controller 118, whereby the chemical, the rinse liquid and the like scattering from the rotating substrate W can be drained in a segregated manner.

Further, one end of an exhaust pipe 160 is connected to the drainage tank 148a. The other end of this exhaust pipe 160 is connected to an unillustrated exhaust device. Thus, gas can be exhausted from the drainage tank 148a and a processing chamber 162 via the exhaust pipe 160. In addition, in this embodiment, an exhaust regulating mechanism 164 is disposed in the exhaust pipe 160, and the exhaust regulating mechanism 164 can regulate the amount of exhaust from the processing chamber 162 in response to an operation command from the unit controller 118. Here, as the exhaust device, power usage of the factory where the substrate processing system 1 of FIG. 1 is installed may be used or an exhaust unit such as a vacuum pump or an exhaust pump may be provided in the substrate processing apparatus 20. Note that the above processing chamber 162 is a space in contact with the substrate top surface in a space formed by surrounding the substrate W held by the spin chuck 106 by the splash guard 150 and a chemical processing, a rinse processing and a dry processing are performed in the processing chamber 162.

As shown in FIG. 4, an apparatus controller 50 for controlling the entire apparatus is provided in the substrate processing apparatus 20, and each electrical component operates in response to an operation command from this apparatus controller 50 to perform a substrate processing. At this time, a command from the apparatus controller 50 is temporarily sent to the unit controller 118 for the electrical components provided in the cleaning unit 100. The unit controller 118 issues an operation command to each component, whereby each component operates. On the other hand, an operation command from the apparatus controller 50 is directly sent to the electrical components provided in the chemical supply section 200 and the rinse liquid supply section 300.

Next, the flow of the substrate processing performed based on a given recipe to the substrate W by the cleaning unit 100 configured as described above is described. FIGS. 5A and 5B are tables showing an example of the content of a recipe, and FIG. 6 is a flow chart showing the flow of the substrate processing based on the recipe of FIGS. 5A and 5B. In this embodiment, the recipe is given which specifies that the chemical processing, the rinse processing and the dry processing are successively performed on the substrate W as shown in FIGS. 5A and 5B. In this recipe, an operation time in each processing, the number of revolutions of the spin base 116 and the supply flow rates and the supply temperatures of the chemical and the rinse liquid are specified.

In performing the substrate processing, the unit controller 118 first lowers the splash guard 150 to cause the spin chuck 106 to project from an upper end part of the splash guard 150. At this time, the nozzle arm 122 is retracted to the outside of the splash guard 150. In this state, the pre-processed substrate W is loaded into the chamber 102 by the substrate conveying robot 31 (FIGS. 2A and 2B) (Step S1). Simultaneously with or after this substrate loading operation, the on-off valve 192 is opened to feed clean air into the fan filter unit 104 and the cleaned air is fed into the central space of the chamber 102. Then, the splash guard 150 is elevated so that the processing liquids (chemical and rinse liquid) scattering from the rotating substrate W in the subsequent chemical processing and rinse processing can be collected.

Subsequently, the nozzle arm moving mechanism 138 moves the nozzle arm 122 to locate the chemical supply nozzle 126 above the central part of the substrate top surface and the substrate W held by the spin chuck 106 is rotated by the drive of the chuck rotating mechanism 110 (Step S2). At this time, the number of revolutions of the spin base 116 is adjusted to 800 rpm in accordance with the recipe. Then, the on-off valve 130 for chemical is opened with the on-off valve 132 for rinse liquid kept closed (Step S3). As a result, the chemical, the flow rate of which is regulated to 1.5 l/min and the temperature of which is regulated to 40° C. in accordance with the recipe, is fed under pressure from the chemical supply section 200 to the chemical supply nozzle 126 and supplied to the substrate top surface from this nozzle 126. Then, the nozzle arm moving mechanism 138 moves the nozzle arm 122 for 5 seconds so that the chemical supply nozzle 126 reciprocates between the positions above the central part and the peripheral edge part of the substrate top surface in a state where the chemical is supplied, whereby the chemical processing is performed (Step S4).

When the chemical processing is completed, the nozzle arm moving mechanism 138 moves the nozzle arm 122 so that the rinse liquid supply nozzle 128 is positioned above the central part of the substrate top surface in place of the chemical supply nozzle 126, and the number of revolutions of the spin base 116 is adjusted to 500 rpm in accordance with the recipe. Then, the on-off valve 130 for chemical is closed and the on-off valve 132 for rinse liquid is opened (Step S5). As a result, instead of the chemical, the rinse liquid, the flow rate of which is regulated to 1.0 l/min and the temperature of which is regulated to 60° C., is fed under pressure from the rinse liquid supply section 300 to the rinse liquid supply nozzle 128 and supplied to the substrate top surface from this nozzle 128. Then, the nozzle arm moving mechanism 138 moves the nozzle arm 122 for 10 seconds so that the rinse liquid supply nozzle 128 reciprocates between the positions above the central part and the peripheral edge part of the substrate top surface in a state where the rinse liquid is supplied, whereby the rinse processing is performed (Step S6).

At the time of the chemical processing and the rinse processing described above, the unit controller 118 controls the fan regulating mechanism 198 to feed a relatively large volume of clean air into the processing chamber 162 by increasing the rotation speed of the fan 104a. Further, a relatively large volume of air is exhausted from the processing chamber 162 by the exhaust regulating mechanism 164. Thus, it can be prevented by the supply of the large volume of clean air from above that a mist of the processing liquid produced during the chemical processing and the rinse processing scatters upward and adhere to the respective parts of the apparatus. Further, an atmosphere including the mist of the processing liquid can be efficiently discharged from the processing chamber 162.

When the rinse processing is completed, the on-off valve 132 for rinse liquid is closed to stop the supply of the rinse liquid to the substrate top surface (Step S7). Thereafter, the nozzle arm moving mechanism 138 moves the nozzle arm 122 so that the chemical supply nozzle 126 and the rinse liquid supply nozzle 128 are located at the standby position retracted laterally from the position above the top surface of the substrate W (Step S8). Then, in accordance with the recipe, the number of revolutions of the spin base 116 is adjusted to 1500 rpm and, after the substrate W is rotated at a high speed for 10 seconds to perform the dry processing, the rotation of the substrate W is stopped (Step S9).

In this way, a series of substrate processing for one substrate W are finished and the processed substrate W is loaded out from the chamber 102 by the substrate conveying robot 31 (Step S10). The same processing as above are also performed on the next substrate W.

Although the substrate processing performed in the substrate processing apparatus 20 in accordance with the recipe shown in FIGS. 5A and 5B are described above, it is necessary to determine in which of the substrate processing apparatuses 20A, 20B and 20C the recipe is to be executed if a plurality of substrate processing apparatuses 20A, 20B and 20C are provided in the substrate processing system 1 as shown in FIG. 1. Accordingly, a determination processing of determining in which of the substrate processing apparatuses 20A, 20B and 20C a given recipe is to be executed by the host computer 10 is described below.

Here, the substrate processing apparatus 20 is so configured that a predetermined assigned processing is performed on the substrate W in each unit called a "functional section" and each functional section is selectively set in an operating state where the assigned processing can be performed and a standby state where an energy consumption amount is less than in the operating state. A resource consumption amount required to recover each functional section from the standby state to the operating state is obtained and the above determination processing is performed by the host commuter 10 based on this resource consumption amount. Note that the "resource" mentioned here is a concept including every resource such as time, power and other energy, chemical, air and other substances.

Figure 7:
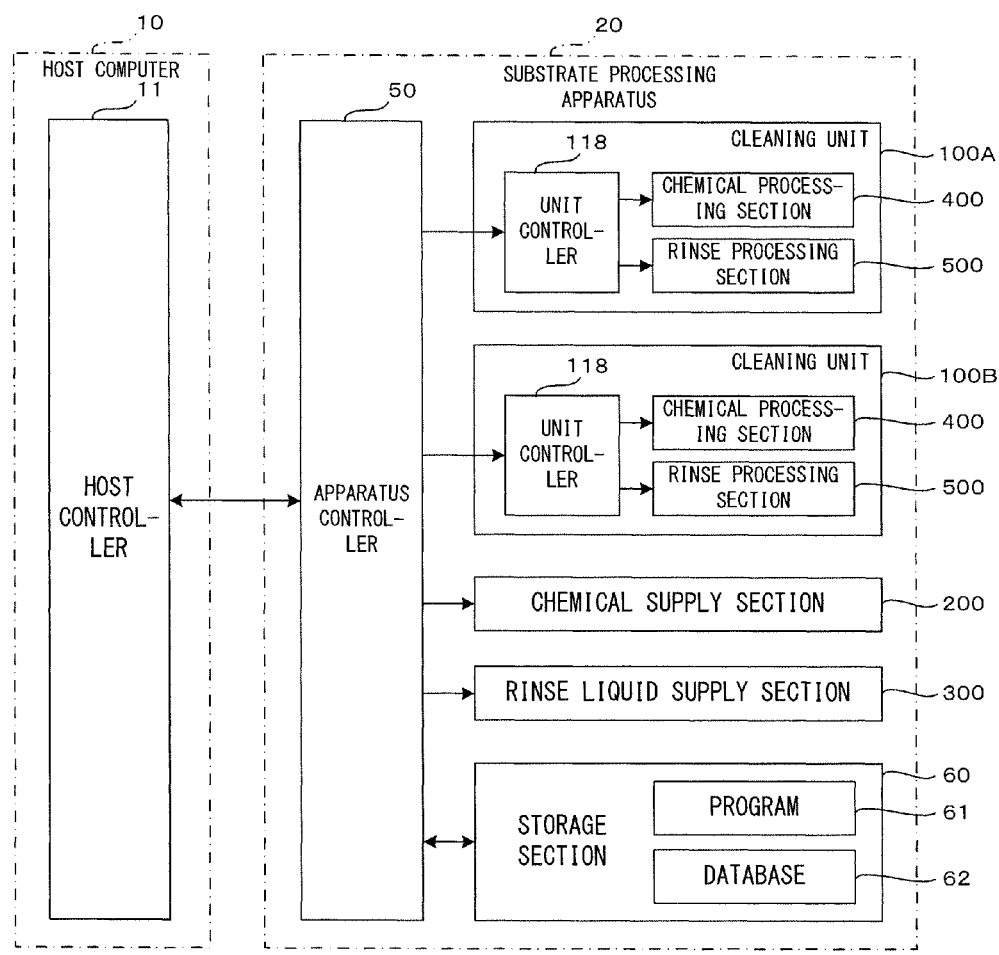
FIG. 7 is a block diagram showing the respective functional sections of the substrate processing apparatus.

FIG. 7 is a block diagram showing the respective functional sections of the substrate processing apparatus. In this embodiment, chemical processing sections 400, rinse processing sections 500, the chemical supply section 200 and the rinse liquid supply section 300 respectively fall under the functional sections. Out of these, the chemical processing section 400 and the rinse processing section 500 are functional sections included in the cleaning unit 100. In other words, the cleaning unit 100 includes the chemical processing section 400 and the rinse processing section 500. Note that although eight cleaning units 100 are installed in the substrate processing apparatus 20 shown in FIGS. 2A and 2B, the substrate processing apparatus 20 is assumed to include only two cleaning units 100A, 100B in the following description to facilitate description.

Here, the chemical processing section 400 is a set of electrical components, out of a plurality of components of the cleaning unit 100, which perform the chemical processing in cooperation based on an operation command from the unit controller 118 in performing the chemical processing on the substrate W. As described above, at the time of the chemical processing, the substrate W is rotated while the number of revolutions of the spin base 116 is controlled by the chuck rotating mechanism 110 and the chemical supply nozzle 126 is moved above the substrate top surface by controlling the nozzle arm moving mechanism 138 while the on-off valve 130 for chemical is opened and the chemical is discharged to the substrate top surface from the chemical supply nozzle 126. Thus, the chemical processing section 400 can be conceived to be composed of the chuck rotating mechanism 110, the on-off valve 130 for chemical and the nozzle arm moving mechanism 138 that receive the operation command from the unit controller 118 during the chemical processing. Similarly, the rinse processing section 500 is composed of the chuck rotating mechanism 110, the on-off valve 132 for rinse liquid and the nozzle arm moving mechanism 138. Further, the chemical supply section 200 is composed of the flow regulating valve 201 and the temperature regulator 202, and the rinse liquid supply section 300 is composed of the flow rate regulating valve 301 and the temperature regulator 302.

The substrate processing apparatus 20 also includes a storage section 60, and a program 61 relating to the execution of the substrate processing and a database 62 relating to the resource consumption amount are stored in this storage section 60. The apparatus controller 50 appropriately accesses the storage section 60 and reads the program 61 and the database 62, whereby predetermined processing and operation are performed. Note that the program 61 is provided in a state stored in various media such as a CD (Compact Disc), a DVD (Digital Versatile Disc) and a USB (Universal Serial Bus) memory or downloaded from a server, and stored in the storage section 60. The apparatus controller 50 performs an operation described below in accordance with the program 61.

FIGS. 8A and 8B are tables showing an example of a database relating to the resource consumption amount. More specifically, FIG. 8A is a table showing the resource consumption amounts for the chemical processing sections 400 and the rinse processing sections 500 of the cleaning units 100A, 100B, and FIG. 8B is a table showing the resource consumption amounts for the chemical supply section 200 and the rinse liquid supply section 300. Here, "transition time (→)" indicates a time required for a transition to a state on the next right side in FIG. 8 and "transition time (←)" indicates a time required for a transition to a state on the next left side in FIG. 8. Further, "maintain power" indicates an electric energy necessary to maintain each state for a unit time. Specifically, data necessary to obtain a functional section recovery time which is a time necessary to recover each functional section to the operating state and a functional section recovery electric energy which is an electric energy necessary to recover each functional section to the operating state are stored in the database 62.

Here, for the chemical processing section 400 and the rinse processing section 500, the operating state where the electrical components have a degree of activity of 100% and the assigned processing can be performed corresponds to an "operating state" of the invention as it is, standby states A to C and a stop state where an energy consumption amount is less than in the operating state correspond to a "standby state" of the invention. On the other hand, for the chemical supply section 200 and the rinse liquid supply section 300, states A to D are specified depending on the temperature of the chemical or the rinse liquid, and which states correspond to the "operating state" and the "standby state" of the invention varies according to a recipe. For example, in the case of executing the recipe of FIGS. 5A and 5B, for the chemical supply section 200, the state C where the temperature of the chemical is 40° C. corresponds to the "operating state" of the invention. For the rinse liquid supply section 300, the state A where the temperature of the rinse liquid is 60° C. corresponds to the "operating state" of the invention. And for the chemical supply section 200, the state D and the stop state where an energy consumption amount is less than in the state C correspond to the "standby state" of the invention. For the rinse liquid supply section 300, the states B to D and the stop state where an energy consumption amount is less than in the state A correspond to the "standby state" of the invention.

Although not particularly shown in FIGS. 8A and 8B, the current state of each functional section is also stored in the database 62, and the apparatus controller 50 can obtain the current state of each functional section by accessing the database 62. Specifically, although described in detail later, the apparatus controller 50 can obtain the above functional section recovery time using the current state and the transition time (←) of each functional section stored in the database 62. Similarly, the apparatus controller 50 can obtain the above functional section recovery electric energy using the current state and the maintain power of each functional section stored in the database 62.

Figure 9:
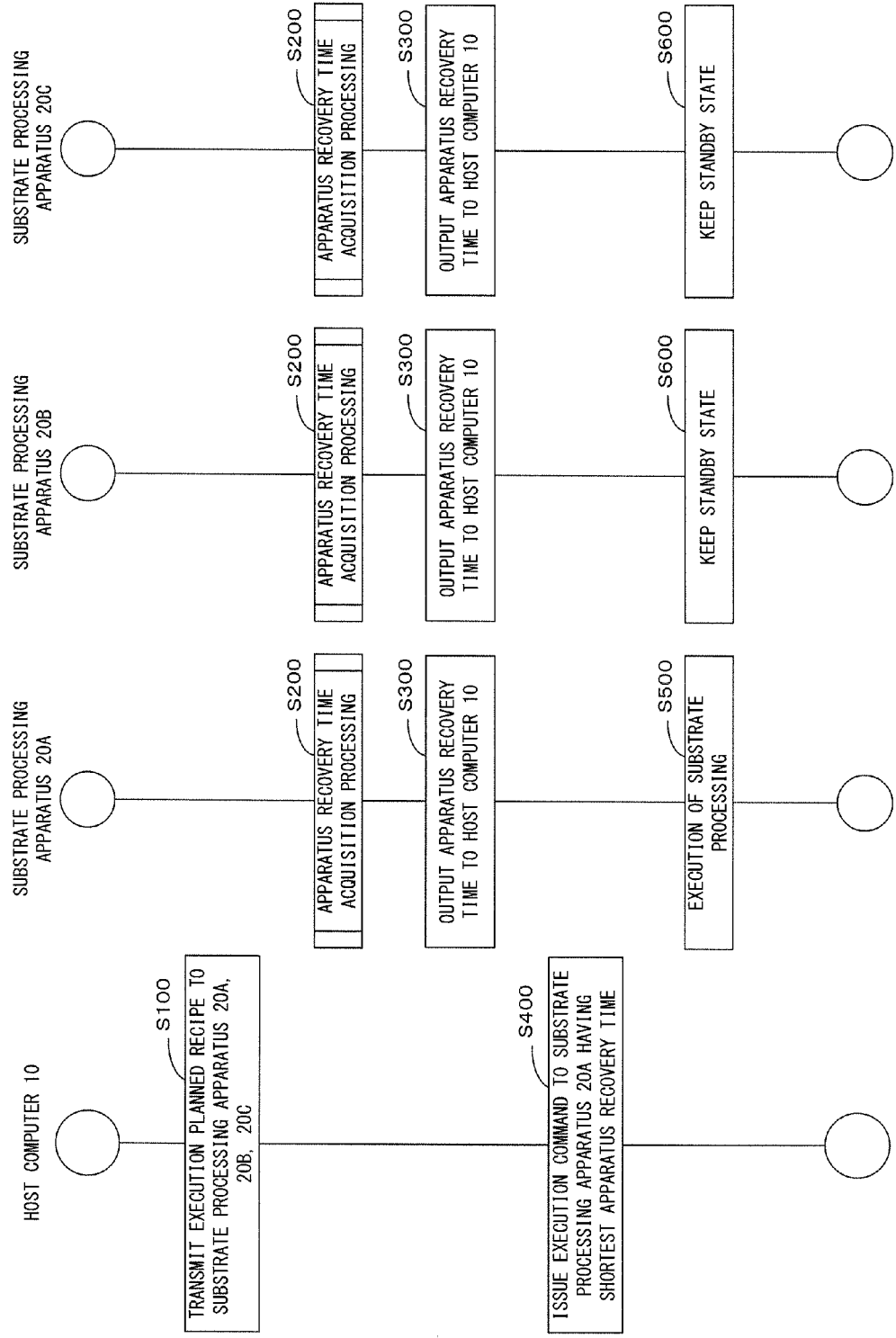
FIG. 9 is a chart showing the determination processing of the substrate processing apparatus for performing the substrate processing.

Next, the flow of the determination processing based on the functional section recovery times is described. FIG. 9 is a chart showing the determination processing of the substrate processing apparatus for performing the substrate processing. First, when an execution planned recipe which is a recipe planned to be executed next is determined such as by an operation via the operation section 12 (FIG. 1), the host computer 10 transmits this execution planned recipe to each of the substrate processing apparatuses 20A, 20B and 20C (Step S100). When receiving the execution planned recipe from the host computer 10, the apparatus controller 50 of each of the substrate processing apparatuses 20A, 20B and 20C performs an apparatus recovery time acquisition processing for obtaining an apparatus recovery time which is a time required until each substrate processing apparatus 20A, 20B, 20C becomes usable for the execution of the execution planned recipe (Step S200). This apparatus recovery time acquisition processing is described in detail later.

Each substrate processing apparatus 20A, 20B, 20C having obtained the apparatus recovery time outputs this apparatus recovery time to the host computer 10 (Step S300). When receiving the apparatus recovery time from each substrate processing apparatus 20A, 20B, 20C, the host controller 11 of the host computer 10 determines to cause the apparatus having the shortest apparatus recovery time out of the substrate processing apparatuses 20A, 20B, 20C to execute the execution planned recipe and issues an execution command to this apparatus. Here, the apparatus recovery time of the substrate processing apparatus 20A is assumed to be shortest and the execution command is issued to the substrate processing apparatus 20A (Step S400). As a result, substrates W to be processed in accordance with the execution planned recipe are conveyed on a lot basis to the indexer section 40 of the substrate processing apparatus 20A and the execution of substrate processing is started (Step S500). On the other hand, the functional sections of the substrate processing apparatuses 20B, 20C to which no execution command was issued are kept in the standby state (Step S600).

Here, the apparatus recovery times output to the host computer 10 in Step S300 and the determination of the substrate processing apparatus 20A as an apparatus for executing the execution planned recipe in Step S400 are displayed on the display section 13 of the host computer 10. Thus, for example, an operator can properly conduct management associated with the substrate processing by referring to information displayed on the display section 13.

Next, the apparatus recovery time acquisition processing performed when the recipe of FIGS. 5A and 5B is given as an execution planned recipe is described. The content of the apparatus recovery time acquisition processing is written in the program 61 and the apparatus recovery time acquisition processing is performed by the apparatus controller 50 of the substrate processing apparatus 20 reading the program 61. FIG. 10 is a flow chart showing the apparatus recovery time acquisition processing, FIGS. 11A and 11B are tables showing the operating state and the current state of each functional section, and FIG. 12 is a table showing a specific example of the apparatus recovery time acquisition processing. Note that, in FIGS. 11A and 11B, states enclosed by heavy-line frames indicate the operating states where the assigned processing corresponding to the recipe of FIG. 5 can be performed, and states enclosed by dotted-line frames indicate the current states.

When receiving the execution planned recipe from the host computer 10, the apparatus controller 50 of the substrate processing apparatus 20 reads the content of the execution planned recipe and specifies the functional sections capable of being in charge of assigned processing corresponding to that execution planned recipe (Steps S201, S202). Since it is specified to perform the chemical processing and the rinse processing in the recipe shown in FIGS. 5A and 5B, all of the chemical processing section 400, the rinse processing section 500, the chemical supply section 200 and the rinse liquid supply section 300 are specified as the functional sections capable of being in charge of the assigned processing. The functional sections specified in this way are referred to as "specified functional sections" below.

Subsequently, the apparatus controller 50 accesses the database 62 and calculates and predicts the functional section recovery time from the current state, the time indicated by "transition time (←)" and the operating state specified by the recipe content (state C for the chemical supply section 200 and the state A for the rinse liquid supply section 300 are the operating states in this recipe) of each specified functional section (Step S203). As shown in FIGS. 11A, 11B and 12, a functional section recovery time, for example, to recover the chemical processing section 400 of the cleaning unit 100A from the standby state B, which is the current state, to the operating state is calculated to be 50 seconds by adding a transition time of 30 seconds necessary for a transition from the standby state B to the standby state A and a transition time of 20 seconds necessary for a transition from the standby state A to the operating state. For the other specified functional sections, the functional section recovery time is similarly obtained as shown in FIG. 12.

When the functional section recovery time of each specified functional section is obtained, for each cleaning unit 100A, 100B, the longest functional section recovery time out of the functional section recovery times of specified functional sections which are included in each unit is set as a unit recovery time (Step S204). As shown in FIG. 12, for example, for the cleaning unit 100A, a functional section recovery time of 50 seconds of the chemical processing section 400 and a functional section recovery time of 1 minute and 40 seconds of the rinse processing section 500 are compared and the longest functional section recovery time of 1 minute and 40 seconds is set as the unit recovery time. Similarly, 1 minute is obtained as the unit recovery time of the cleaning unit 100B. The unit recovery time obtained in this way means a time required for all the specified functional sections included in each cleaning unit 100A, 100B to be set in the operating state, i.e. a recovery time required until each cleaning unit 100A, 100B becomes usable for the execution of the given execution planned recipe.

If one substrate processing apparatus 20 includes a plurality of cleaning units 100 capable of performing the same type of assigned processing, it is necessary to determine which of the plurality of cleaning units 100 is used to perform the substrate processing. Accordingly, when the unit recovery times of the respective cleaning units 100A, 100B are obtained, a use planned unit planned to be used for the substrate processing is determined based on the unit recovery times of the respective cleaning units 100A, 100B (Step S205). For example, in this embodiment, the cleaning unit 100B having the shortest unit recovery time is determined as the use planned unit. By determining the unit having a short unit recovery time as the use planned unit, the apparatus recovery time to be described later can be shortened.

Finally, the longest recovery time out of the unit recovery time of the cleaning unit 100B determined as the use planned unit in Step S204 and the functional section recovery times of the respective specified functional sections not included in the cleaning units 100A, 100B is set as the apparatus recovery time (Step S206). Specifically, as shown in FIG. 12, the unit recovery time of 1 minute of the cleaning unit 100B, the functional section recovery time of 50 minutes of the chemical supply section 200 and the functional section recovery time of 1 hour of the rinse liquid supply section 300 are compared, and the longest recovery time of 1 hour is set as the apparatus recovery time. The apparatus recovery time obtained in this way means a time required until all of the use planned unit included in the substrate processing apparatus 20 and the specified functional sections not included in the cleaning units 100A, 100B reach the operating state, i.e. a recovery time required until the substrate processing apparatus 20 becomes usable for the execution of the given execution planned recipe.

Then, the apparatus recovery time of each of the substrate processing apparatuses 20A, 20B and 20C obtained in this way is output to the host computer 10 and the host controller 11 of the host computer 10 determines which of the apparatuses is to be caused to execute the execution planned recipe based on the respective apparatus recovery times.

As described above, in this embodiment, the substrate processing apparatus includes a plurality of functional sections (chemical supply section 200, rinse liquid supply section 300, chemical processing section 400, rinse processing section 500) each capable of performing the assigned processing. These functional sections 200, 300, 400 and 500 are capable of performing assigned processing different from each other and can be selectively set in the operating state where the assigned processing can be performed and the standby state where an energy consumption amount is less than in the operating state. Out of these functional sections 200, 300, 400 and 500, the functional sections in charge of the assigned processing corresponding to the recipe perform the assigned processing in the operating state, whereby the processing procedure specified in the recipe is performed on the substrate W. Particularly in this embodiment, if an execution planned recipe, which is a recipe planned to be executed later, is given, the specifying operation of specifying the functional sections capable of performing assigned processing corresponding to this execution planned recipe from the plurality of functional sections 200, 300, 400 and 500 is performed (Step S202). Then, a time necessary to recover each specified functional section specified in the specifying operation to the operating state (functional section recovery time) is predicted (Step S203). By accurately obtaining the time (resource) required to recover the functional sections 200, 300, 400 and 500 capable of performing the assigned processing to the operating state in conformity with the content of the recipe in this way, management associated with the substrate processing can be properly conducted.

Further, in the substrate processing system 1 according to this embodiment, the apparatus recovery time of each substrate processing apparatus 20A, 20B, 20C is obtained based on the functional section recovery times of the specified functional sections 200 300, 400 and 500 obtained for each substrate processing apparatus 20A, 20B, 20C. Such a configuration enables the apparatus recovery times to be obtained in conformity with the execution planned recipe and contributes to proper management of the substrate processing apparatuses 20A, 20B and 20C with the execution of the execution planned recipe. Further, the substrate processing apparatus 20 for executing the execution planned recipe is determined out of the plurality of substrate processing apparatuses 20A, 20B and 20C based on the obtained apparatus recovery times. In this way, it can be determined to use the substrate processing apparatus 20 proper in terms of the management of the time required for the start of the execution planned recipe for the execution of the execution planned recipe.

Particularly, since the apparatus recovery time is obtained from the times required to recover the specified functional sections 200, 300, 400 and 500 capable of performing the assigned processing corresponding to the execution planned recipe to the operating state, the apparatus recovery time can be accurately obtained in conformity with the content of the execution planned recipe. As a result, time management associated with the substrate processing can be properly conducted.

In the substrate processing apparatus 20 according to this embodiment, any of the plurality of cleaning units 100A, 100B includes the chemical processing section 400 and the rinse processing section 500. That is, the functional sections 400, 500 capable of performing the same assigned processing (chemical processing, rinse processing) are provided in each of the plurality of cleaning units 100A, 100B. Thus, the functional sections 400, 500 provided in each of the cleaning units 100A, 100B may be specified as the functional sections in Step S202. In such a case, it is necessary to determine which of the cleaning units 100A, 100B is to be caused to perform this processing. Accordingly, in this embodiment, which of the cleaning units 100A, 100B is to be used is determined, using the functional section recovery times of the specified functional sections 400, 500 as judgment criteria (Step S204, S205). This enables the determination of the cleaning unit 100 proper in terms of the management of the time required for the start of the execution planned recipe. Particularly in this embodiment, by obtaining the time required until the cleaning unit 100A, 100B becomes usable (unit recovery time) for each of the cleaning units 100A, 100B, which of the cleaning units 100 is proper in terms of time management can be easily judged.

In addition, since the unit recovery time is obtained from the times required to recover the specified functional sections capable of performing the assigned processing corresponding to the execution planned recipe to the operating state, the unit recovery time can be accurately obtained in conformity with the content of the execution planned recipe. As a result, time management associated with the substrate processing can be properly conducted.

Each of the above cleaning units 100A, 100B includes a plurality of functional sections (chemical processing section 400, rinse processing section 500) in charge of the processing different from each other. Thus, depending on the content of the execution planned recipe, both of these functional sections 400, 500 may be specified as the specified functional sections. In such a case, in this embodiment, the longest one of the functional section recovery times of the plurality of specified functional sections 400, 500 is obtained as the unit recovery time for each of the cleaning units 100A, 100B. The unit recovery time obtained in this way is a time necessary to recover all the specified functional sections 400, 500 included in the cleaning unit 100A, 100B to the operating state, i.e. a time necessary until the cleaning unit 100A, 100B as a collection of the functional sections reaches a state where the execution planned recipe can be executed. Thus, the unit recovery time can be accurately grasped. Further, in the substrate processing apparatus 20 of this embodiment, the cleaning unit 100B having the shortest unit recovery time is determined as the unit used for the execution of the execution planned recipe (Step S205). This enables the time required to recover the cleaning unit 100 for the start of the execution planned recipe to be efficiently reduced.

Further, the database storing the resource consumption amount for each state of each of the functional sections 200, 300, 400 and 500 is provided in this embodiment, and the resource consumption amounts required to recover the specified functional sections 200, 300, 400 and 500 to the operating state (e.g. time required for recovery) is obtained based on this database. By using such a database, the amount of resource to be consumed by the functional section 200, 300, 400, 500 can be easily calculated only by adding the resource consumption amount in each state up to the recovery. Further, also when the configuration or the like of each functional section 200, 300, 400, 500 is changed, the resource consumption amount can be accurately obtained by appropriately updating data of the corresponding part.

Further, in this embodiment, the functional sections 200, 300, 400 and 500 can be set in a plurality of standby states with different energy consumption amounts. By providing a plurality of standby states, the states of the functional sections 200, 300, 400 and 500 can be more finely controlled.

Further, the database of this embodiment stores a plurality of types of resources (two types: transition time and maintain power) to be consumed in each state of each functional section. Thus, the apparatus controller 50 can simultaneously calculate the time required to recover each functional section 200, 300, 400, 500 to the operating state and an electric energy required for recovery. This enables the states of the functional sections 200, 300, 400 and 500 to be more finely managed. Further, it is possible to execute a control in response to various requests of prioritizing the shortening of the time until the specified functional sections 200, 300, 400 and 500 are recovered to the operating state or prioritizing a reduction in the electric energy to be consumed until the specified functional sections are recovered to the operating state. Thus, the states of the specified functional sections 200, 300, 400 and 500 can be more properly controlled.

As described above, in the first embodiment, the substrate processing system 1 corresponds to an example of a "substrate processing system" of the invention, the substrate processing apparatus 20 corresponds to an example of a "substrate processing apparatus" of the invention, the apparatus controller 50 of the substrate processing apparatus 20 corresponds to an example of each of a "controller", a "resource consumption amount acquisition section", an "information acquisition device" and a "computer" of the invention, the host controller 11 of the host computer 10 corresponds to an example of a "control device" of the invention, and the display section 13 of the host computer 10 corresponds to an example of a "display device" of the invention. Further, in the first embodiment, the recovery time is obtained as a resource amount and the unit recovery time corresponds to an example of a "unit consumption amount" of the invention, and the apparatus recovery time corresponds to an example of an "apparatus consumption amount" of the invention.

Second Embodiment

A second embodiment of the substrate processing system according to an aspect of the invention is described. In the second embodiment, an apparatus recovery electric energy acquisition processing for obtaining a recovery electric energy as the resource consumption amount is performed instead of the apparatus recovery time acquisition processing (see FIG. 9) in the first embodiment. In the apparatus recovery electric energy acquisition processing, the apparatus recovery time is obtained by a technique similar to that of the first embodiment and a schedule of a recovery operation of each specified functional section is determined utilizing this apparatus recovery time. Subsequently, a consumed electric energy to be consumed when each unit is recovered is obtained and a use planned unit is determined based on this consumed electric energy. Then, the apparatus recovery electric energy is calculated by adding the consumed electric energy of the use planned unit and the consumed electric energies of the specified functional sections other than the unit. In the second embodiment, an apparatus in which an execution planned recipe is to be executed is determined based on the apparatus recovery electric energy obtained in this way.

Figure 13:
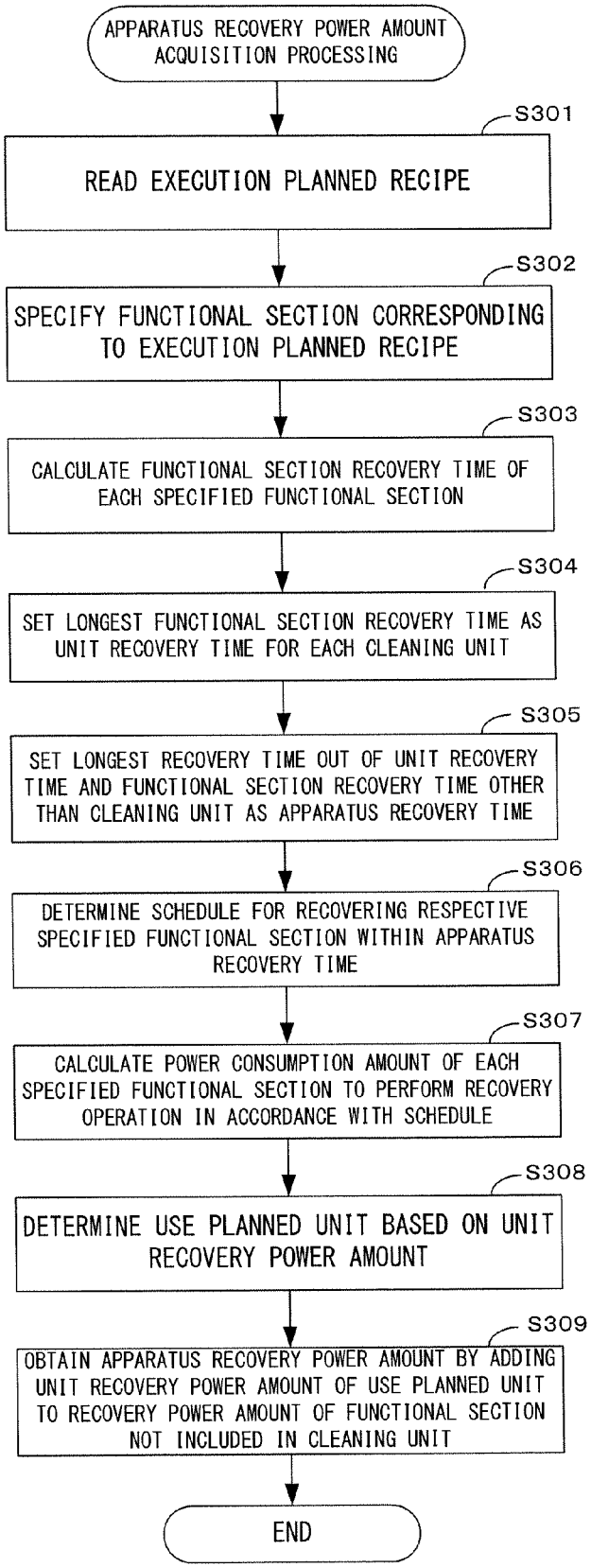
FIG. 13 is a flow chart showing the apparatus recovery electric energy acquisition processing.

Since the apparatus configurations of the second embodiment are similar to those of the first embodiment, common parts are described using the same reference signs as in the first embodiment. Here, FIG. 13 is a flow chart showing the apparatus recovery electric energy acquisition processing, and FIGS. 14A-14D are charts showing schedules of recovery operations of functional sections. More specifically, FIGS. 14A-14D are time charts showing electric energies required when the respective specified functional sections perform the recovery operations in accordance with the schedules described later along a time axis. FIG. 15 is a table showing a specific example of the apparatus recovery electric energy acquisition processing. Note that, in the second embodiment, an execution planned recipe to be given is the recipe shown in FIGS. 5A and 5B and the current states of the respective specified functional sections are states shown by dotted-line frames of FIGS. 11A and 11B.

The apparatus recovery electric energy acquisition processing is described based on FIG. 13. In the apparatus recovery electric energy acquisition processing, an apparatus recovery time is first determined by a technique similar to that of the first embodiment. When receiving an execution planned recipe from a host computer 10, an apparatus controller 50 of a substrate processing apparatus 20 reads the content of the execution planned recipe and specifies functional sections capable of being in charge of assigned processing corresponding to that execution planned recipe (Step S301, S302). Since it is specified to perform the chemical processing and the rinse processing in the recipe shown in FIGS. 5A and 5B, all of a chemical processing section 400, a rinse processing section 500, a chemical supply section 200 and a rinse liquid supply section 300 are specified as specified functional sections.

Subsequently, the apparatus controller 50 accesses a database 62 and calculates and predicts a functional section recovery time from the current state, a time indicated by "transition time (←)" and an operating state specified by the recipe content (state C for the chemical supply section 200 and state A for the rinse liquid supply section 300 are the operating states in this recipe) of each specified functional section (Step S303). When the functional section recovery time of each specified functional section is obtained, for each cleaning unit 100A, 100B, the longest functional section recovery time out of the functional section recovery times of specified functional sections (chemical supply section 200 and rinse liquid supply section 300) which are included in each unit is set as a unit recovery time (Step S304). In this way, it is found that the times required to recover the cleaning units 100A, 100B from the current state to the operating state (unit recovery times) are respectively 1 minute and 40 seconds and 1 minute (see FIG. 12). On the other hand, it is found that the times required to recover the chemical supply section 200 and the rinse liquid supply section 300 from the current state to the operating state (functional section recovery times of the sections other than the cleaning units) are respectively 50 minutes and 1 hour (see FIG. 12). Subsequently, the longest recovery time out of the unit recovery times and the functional section recovery times of the sections other than the cleaning units is determined as an apparatus recovery time (Step S305). Here, since the functional section recovery time of the rinse liquid supply section 300 (1 hours) is longest, this is determined as the apparatus recovery time.

Figure 14A:
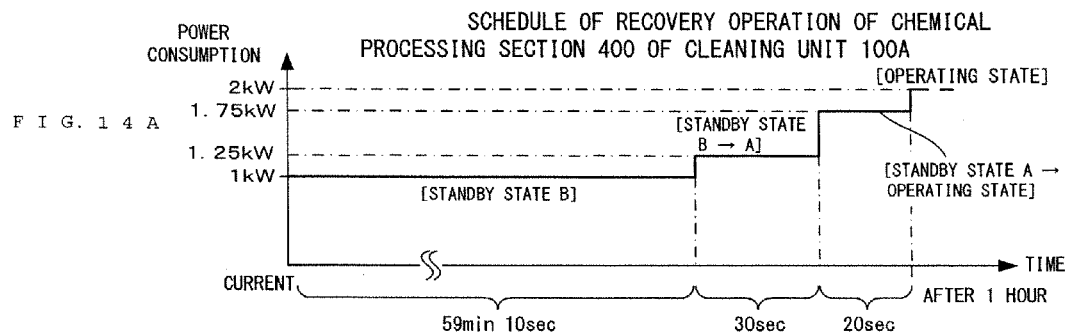
FIGS. 14A, 14B, 14C and 14D are charts showing schedules of recovery operations of functional sections.

Subsequently, schedules for recovering the respective specified functional sections within the apparatus recovery time are determined (Step S306). FIG. 14A shows a schedule for recovering the chemical processing section 400 of the cleaning unit 100A to the operating state. It is inferred from the apparatus recovery time obtained in Step S305 that a recovery completion time of this apparatus is after 1 hour and the execution planned recipe is executed at this recovery completion time. Thus, each specified functional section is desirably already recovered to the operating state in 1 hour. As shown in FIGS. 11A and 11B, the current state of the chemical processing section 400 of the cleaning unit 100A is the standby state B. A time required to recover from the standby state B to the operating state is 50 seconds by adding a time (30 seconds) required for a transition from the standby state B to a standby state A and a time (20 seconds) required for a transition from the standby state A to the operating state. Thus, the recovery operation of the chemical processing section 400 of the cleaning unit 100A may be started in 59 minutes and 10 seconds from now. Therefore, the schedule is determined in which the chemical processing section 400 of the cleaning unit 100A keeps the current standby state B for 59 minutes and 10 seconds and then a transition operation from the standby state B to the standby state A and a transition operation from the standby state A to the operating state are successively performed.

Figure 14B:
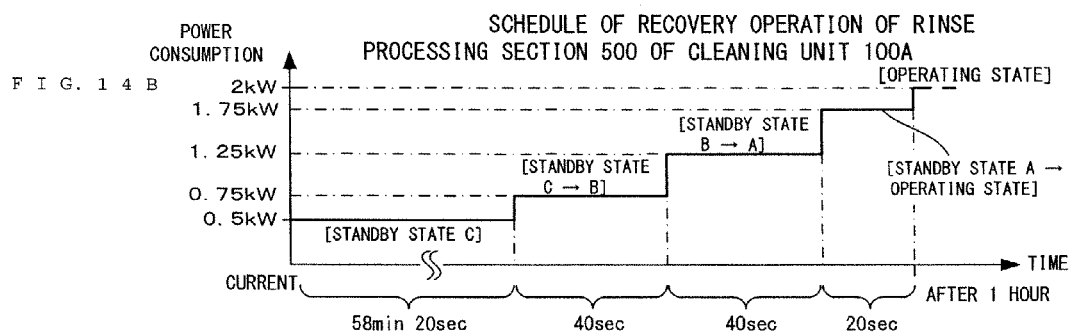

FIG. 14B shows a schedule for recovering the rinse processing section 500 of the cleaning unit 100A to the operating state. As shown in FIGS. 11A and 11B, the current state of the rinse processing section 500 of the cleaning unit 100A is the standby state C. A time required to recover from the standby state C to the operating state is 1 minute and 40 seconds by adding a time (40 seconds) required for a transition from the standby state C to the standby state B, a time (40 seconds) required for a transition from the standby state B to the standby state A and a time (20 seconds) required for a transition from the standby state A to the operating state. Thus, the recovery operation of the rinse processing section 500 of the cleaning unit 100A may be started in 58 minutes and 20 seconds from now. Therefore, the schedule is determined in which the rinse processing section 500 of the cleaning unit 100A keeps the current standby state C for 58 minutes and 20 seconds and then a transition operation from the standby state C to the standby state B, a transition operation from the standby state B to the standby state A and a transition operation from the standby state A to the operating state are successively performed.

Figure 14C:
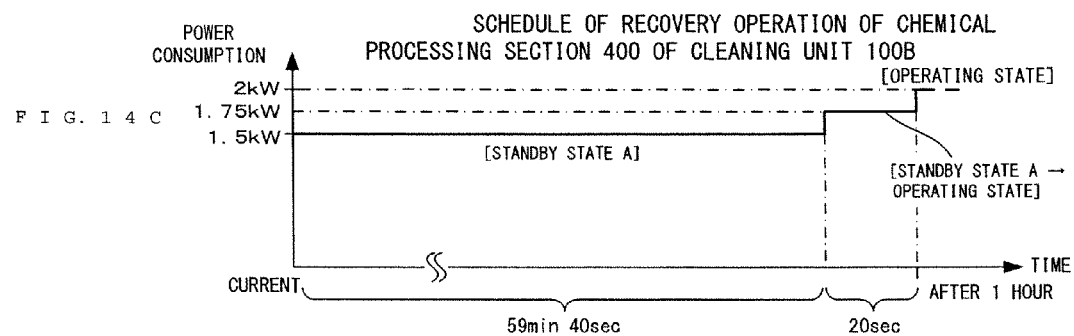

FIG. 14C shows a schedule for recovering the chemical processing section 400 of the cleaning unit 100B to the operating state. As shown in FIGS. 11A and 11B, the current state of the chemical processing section 400 of the cleaning unit 100B is the standby state A. A time required to recover from the standby state A to the operating state is 20 seconds. Thus, the recovery operation of the chemical processing section 400 of the cleaning unit 100B may be started in 59 minutes and 40 seconds from now. Therefore, the schedule is determined in which the chemical processing section 400 of the cleaning unit 100B keeps the current standby state A for 59 minutes and 40 seconds and then a transition operation from the standby state A to the operating state is performed.

Figure 14D:
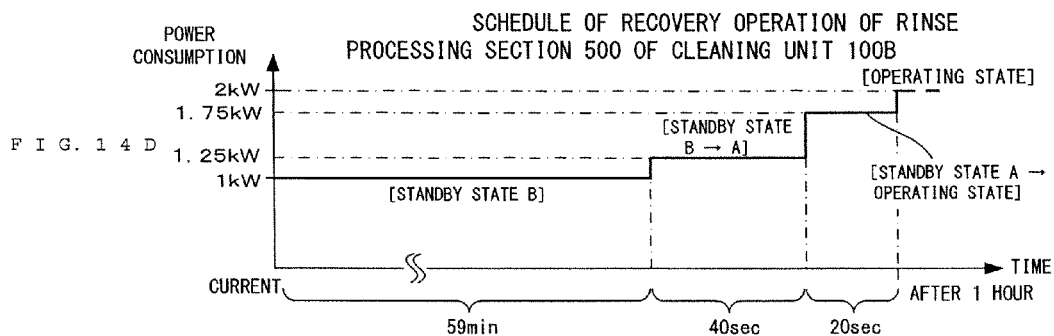

FIG. 14D shows a schedule for recovering the rinse processing section 500 of the cleaning unit 100B to the operating state. As shown in FIGS. 11A and 11B, the current state of the rinse processing section 500 of the cleaning unit 100B is the standby state B. A time required to recover from the standby state B to the operating state is 1 minute by adding a time (40 seconds) required for a transition from the standby state B to the standby state A and a time (20 seconds) required for a transition from the standby state A to the operating state. Thus, the recovery operation of the rinse processing section 500 of the cleaning unit 100B may be started in 59 minutes from now. Therefore, the schedule is determined in which the rinse processing section 500 of the cleaning unit 100B keeps the current standby state B for 59 minutes and then a transition operation from the standby state B to the standby state A and a transition operation from the standby state A to the operating state are successively performed.

From a similar thought, a schedule is determined for the chemical supply section 200 in which the current stop state is kept for 10 minutes and then a transition operation (30 minutes) from the stop state to the state D and a transition operation (20 minutes) from the state D to the state C (operating state) are successively performed. A schedule is determined for the rinse liquid supply section 300 in which a transition operation from the current state C to the state B is immediately started and then a transition from the state B to the state A (operating state) is performed.

Subsequently, the apparatus controller 50 accesses the database 62 and calculates an electric energy required to recover each specified functional section to the operating state in accordance with the schedule determined in Step S306 (functional section recovery electric energy) (Step S307).

As shown in FIGS. 11A and 11B, the maintain power in the standby state B of the chemical processing section 400 of the cleaning unit 100A is 1 kW. According to the determined schedule, the standby state B of this chemical processing section 400 continues for 59 minutes and 10 seconds. Thus, an electric energy consumed during the standby state B by this chemical processing section 400 is 0.986 kWh (=1 kW×59 min 10 sec). Subsequently, the chemical processing section 400 of the cleaning unit 100A transitions from the standby state B to the standby state A. The power (transitional power) of this chemical processing section 400 during this transition period is 1.25 kW which is an average of the maintain power (1 kW) in the standby state B and the maintain power (1.5 kW) in the standby state A. Since the transition period from the standby state B to the standby state A is 30 seconds, an electric energy consumed during this transition period is 0.010 kWh (=1.25 kW×30 sec). Subsequently, the chemical processing section 400 of the cleaning unit 100A transitions from the standby state A to the operating state. The power (transitional power) of this chemical processing section 400 during this transition period is 1.75 kW which is an average of the maintain power (1.5 kW) in the standby state A and the maintain power (2 kW) in the operating state. Since the transition period from the standby state A to the operating state is 20 seconds, an electric energy consumed during this transition period is 0.010 kWh (=1.75 kW×20 sec). From the above, the electric energy required to recover the chemical processing section 400 of the cleaning unit 100A to the operating state in accordance with the schedule determined in Step S306 (functional section recovery electric energy) is 1.006 kWh (=0.986 kWh+0.010 kWh+0.010 kWh) which is the sum of the electric energies during the above respective periods.

A similar calculation is carried out for the rinse processing section 500 of the cleaning unit 100A. According to the schedule determined in Step S306, this rinse processing section 500 waits in the standby state C for 58 minutes and 20 seconds and the transition from the standby state C to the standby state B, the transition from the standby state B to the standby state A, and the transition from the standby state A to the operating state are successively made. An electric energy consumed in the standby state C by this rinse processing section 500 is 0.486 kWh. Further, electric energies consumed during the respective transition periods are respectively 0.008 kWh, 0.014 kWh and 0.010 kWh. From the above, the electric energy required to recover the rinse processing section 500 to the operating state in accordance with the schedule (functional section recovery electric energy) is 0.518 kWh (=0.486 kWh+0.008 kWh+0.014 kWh+0.010 kWh) which is the sum of the electric energies during the above respective periods. Thus, an electric energy required to recover the entire cleaning unit 100A comprising the chemical processing section 400 and the rinse processing section 500 to the operating state in accordance with the above schedule (unit recovery electric energy) is 1.524 kWh (=1.006 kWh+0.518 kWh).

Subsequently, an electric energy required to recover the chemical processing section 400 of the cleaning unit 100B to the operating state (functional section recovery electric energy) is calculated. According to the above schedule, this chemical processing section 400 waits in the standby state A for 59 minutes and 40 seconds. An electric energy consumed by this chemical processing section 400 during this period is 1.492 kWh. An electric energy consumed during a next transition period from the standby state A to the operating state is 0.010 kWh. From the above, the electric energy required to recover the chemical processing section 400 to the operating state in accordance with the above schedule (functional section recovery electric energy) is 1.502 kWh (=1.492 kWh+0.010 kWh) which is the sum of the electric energies during the above respective periods.

Similarly, an electric energy required to recover the rinse processing section 500 of the cleaning unit 100B to the operating state (functional section recovery electric energy) is calculated. According to the above schedule, this rinse processing section 500 waits in the standby state B for 59 minutes. An electric energy consumed by this rinse processing section 500 during this period is 0.982 kWh (=1 kW×59 min) which is a product of the maintain power in the standby state B and a standby period. An electric energy consumed during a transition period from the standby state B to the standby state A and an electric energy consumed during a transition period from the standby state A to the operating state are respectively 0.014 kWh (1.25 kW×40 sec), 0.010 kWh (=1.75 kW×20 sec) which are products of the transitional powers during the respective transition periods and the durations of the respective periods. From the above, an electric energy required to recover this rinse processing section 500 to the operating state in accordance with the above schedule (functional section recovery electric energy) is 1.007 kWh (=0.983 kWh+0.014 kWh+0.010 kWh) which is the sum of the electric energies during the respect periods. Thus, an electric energy required to recover the entire cleaning unit 100B comprising the above chemical processing section 400 and rinse processing section 500 to the operating state (unit recovery electric energy) is 2.509 kWh (=1.502 kWh+1.007 kWh).

Next, an electric energy required to recover the chemical supply section 200 to the operating state is calculated. According to the schedule determined in Step S306, this chemical supply section 200 waits in the stop state for 10 minutes. An electric energy consumed during this period is zero. An electric energy consumed during a transition period from the stop state to the standby state D and an electric energy consumed during a transition period from the standby state D to the standby state C as the operating state are respectively 0.250 kWh (0.5 kW×30 sec), 0.500 kWh (=1.5 kW×20 sec) which are products of the transitional powers during the respective transition periods and the durations of the respective periods. From the above, the electric energy required to recover the chemical supply section 200 to the operating state in accordance with the above schedule (functional section recovery electric energy) is 0.750 kWh (=0.250 kWh+0.500 kWh) which is the sum of the electric energies during the above respective periods.

Similarly, an electric energy required to recover the rinse liquid supply section 300 to the operating state is calculated. According to the schedule determined in Step S306, this rinse liquid supply section 300 transitions from the current standby state C to the standby state B for 30 minutes. During this transition period, an electric energy of 2.000 kWh (=4 kW×30 min) which is the product of the transitional power and the duration of the transition period is consumed. Subsequently, a transition is made from the standby state B to the standby state A as the operating state for 30 minutes. During this transition period, an electric energy of 3.750 kWh (=7.5 kW×30 min) which is the product of the transitional power and the duration of the transition period is consumed. From the above, the electric energy required to recover rinse liquid supply section 300 to the operating state in accordance with the above schedule (functional section recovery electric energy) is 5.750 kWh (=2.000 kWh+3.750 kWh) which is the sum of the electric energies during the above respective periods.

If one substrate processing apparatus 20 includes a plurality of cleaning units 100 capable of performing the same type of assigned processing, it is necessary to determine which of the plurality of cleaning units 100 is used to perform the substrate processing. Accordingly, when the unit recovery electric energies of the respective cleaning units 100A, 100B are obtained, a use planned unit planned to be used for the substrate processing is determined based on the unit recovery electric energies of the respective cleaning units 100A, 100B (Step S308). Since the unit recovery electric energy of the cleaning unit 100A is 1.524 kWh and that of the cleaning unit 100B is 2.509 kWh in this embodiment, the cleaning unit 100A having the smallest unit recovery electric energy is determined as the use planned unit (see FIG. 15). By setting the unit having the small unit recovery electric energy as the use planned unit in this way, the apparatus recovery electric energy to be described later can be reduced.

Finally, the unit recovery electric energy of the cleaning unit 100A determined as the use planned unit in Step S308 and the functional section recovery electric energies of the respective specified functional sections not included in the cleaning units 100A, 100B are added to obtain the apparatus recovery electric energy (Step S309). Specifically, as shown in FIG. 15, the apparatus recovery electric energy is 8.024 kWh by adding a unit recovery electric energy of 1.524 kWh of the cleaning unit 100A, a functional section recovery electric energy of 0.750 kWh of the chemical supply section 200 and a functional section recovery electric energy of 5.750 kWh of the rinse liquid supply section 300. The apparatus recovery electric energy obtained in this way means an electric energy consumed until all of the use planned unit 100A and the specified functional sections included in the substrate processing apparatus 20 reach the operating state, the specified functional sections being not included in the cleaning units 100A, 100B, i.e. a recovery electric energy consumed until the substrate processing apparatus 20 becomes usable for the execution of the given execution planned recipe.

Then, the apparatus recovery electric energy of each of the substrate processing apparatuses 20A, 20B and 20C obtained in this way is output to the host computer 10 and the host controller 11 of the host computer 10 determines which of the apparatuses is to be caused to execute the execution planned recipe based on the respective apparatus recovery electric energies. For example, it can be determined to cause the apparatus having the smallest apparatus recovery electric energy to execute the execution planned recipe.

As described above, in this embodiment, if an execution planned recipe, which is a recipe planned to be executed later, is given, a specifying operation of specifying the functional sections capable of being in charge of assigned processings corresponding to this execution planned recipe from the plurality of functional sections 200, 300, 400 and 500 is performed (Step S302). Then, the apparatus recovery time is obtained based on the functional section recovery times required to recover the respective specified functional sections to the operating state (Steps S303 to 305) and schedules for recovering the respective specified functional sections based on this apparatus recovery time is determined (Step S306). By calculating the apparatus recovery time required until the substrate processing apparatus becomes usable for the execution of the execution planned recipe and setting the schedule of the recovery operation of each specified functional section based on this apparatus recovery time in this way, each specified functional section can be reliably recovered to the operating state before the apparatus recovery time elapses. Further, electric energies (functional section recovery electric energies) necessary to recover the specified functional sections to the operating state based on these schedules are predicted (Step S307). By accurately obtaining the electric energy (resource) required to recover the functional sections 200, 300, 400 and 500 capable of performing the assigned processing to the operating state in conformity with the content of the recipe in this way, management associated with the substrate processing can be properly conducted. Specifically, management associated with the substrate processing can be conducted, considering not only the time required to recover the specified functional sections for the execution of the execution planned recipe, but also the electric energy required for recovery. Thus, it becomes possible not only to shorten the time up to the execution of the execution planned recipe, but also to reduce the electric energy consumed up to the recovery.

Further, in the substrate processing system 1 according to this embodiment, the apparatus recovery electric energy of each substrate processing apparatus 20A, 20B, 20C is obtained based on the functional section recovery electric energies of the specified functional sections 200 300, 400 and 500 obtained for each substrate processing apparatus 20A, 20B, 20C. Such a configuration enables the apparatus recovery electric energies to be obtained in conformity with the execution planned recipe and contributes to proper management of the substrate processing apparatuses 20A, 20B and 20C with the execution of the execution planned recipe. Further, the substrate processing apparatus 20 for executing the execution planned recipe is determined out of the plurality of substrate processing apparatuses 20A, 20B and 20C based on the obtained apparatus recovery electric energies. In this way, it can be determined to use the substrate processing apparatus 20 proper in terms of the management of the electric energy required for the start of the execution planned recipe for the execution of the execution planned recipe.

Particularly, since the apparatus recovery electric energy is obtained from the electric energies required to recover the specified functional sections 200, 300, 400 and 500 capable of being in charge of the assigned processing corresponding to the execution planned recipe to the operating state, the apparatus recovery electric energy can be accurately obtained in conformity with the content of the execution planned recipe. As a result, electric energy management associated with the substrate processing can be properly conducted.

Also in this embodiment, the functional sections 400, 500 capable of performing the same assigned processing (chemical processing, rinse processing) are provided in each of the plurality of cleaning units 100A, 100B. Thus, the functional sections 400, 500 provided in each of the cleaning units 100A, 100B may be specified as the functional sections in Step S302. In such a case, it is necessary to determine which of the cleaning units 100A, 100B is to be caused to perform these processing. Accordingly, in this embodiment, which of the cleaning units 100A, 100B is to be used is determined, using the functional section recovery electric energies of the specified functional sections 400, 500 as judgment criteria (Step S308). This enables the determination of the cleaning unit 100 proper in terms of the management of the electric energy required for the start of the execution planned recipe. Particularly in this embodiment, by obtaining the electric energy required until the cleaning unit 100A, 100B becomes usable (unit recovery electric energy) for each of the cleaning units 100A, 100B, which of the cleaning units 100 in terms of electric energy management is proper can be easily judged.

In addition, since the unit recovery electric energy is obtained from the electric energies required to recover the specified functional sections capable of performing the assigned processing corresponding to the execution planned recipe to the operating state, the unit recovery electric energy can be accurately obtained in conformity with the content of the execution planned recipe. As a result, electric energy management associated with the substrate processing can be properly conducted.

Further, in this embodiment, the apparatus recovery time enabling the execution of the given execution planned recipe is calculated and the schedule of the recovery operation of each specified functional section is set based on the apparatus recovery time. Thus, each specified functional section can be reliably recovered to the operating state until the apparatus recovery time elapses. In addition, in this embodiment, the recovery schedules are so set that the recovery operation is started with a delay for units having a relatively short recovery time such as the chemical processing section 400 and the rinse processing section 500. Thus, the consumed electric energy required for recovery can be reduced. Further, according to this embodiment, management associated with the substrate processing can be conducted, considering not only the time required in recovering the specified functional sections for the execution of the execution planned recipe, but also the electric energy required for recovery. Therefore, it is possible not only merely to shorten the time up to the execution of the execution planned recipe, but also to reduce the electric energy to be consumed up to the recovery.

Note that, in this embodiment, the recovery operation of each specified functional section is only an operation of successively transitioning from a standby state with less maintain power to a standby state with more maintain power. For example, as shown in FIG. 14A, the chemical processing section 400 of the cleaning unit 100A successively transitions from a state with less maintain power to a state with more maintain power such as a transition from the current standby state B (maintain power of 1 kW) to the standby state A (maintain power of 1.5 kW) and a subsequent transition from this standby state to the operating state (maintain power of 2 kW). However, since the maintain power is relatively large even in the standby state B, the recovery schedule may be so set as to start the recovery operation in time for an apparatus recovery timing after a transition is made from the standby state B to the standby state C with less maintain power or to the stop state if the apparatus recovery time is relatively long. The consumed electric energy can be more actively reduced by such a configuration that the functional section can select the standby state in accordance with the content of the execution planned recipe out of a plurality of standby states.

Each of the above cleaning units 100A, 100B includes a plurality of functional sections (chemical processing section 400, rinse processing section 500) in charge of the processing different from each other. Thus, depending on the content of the execution planned recipe, both of these functional sections 400, 500 may be specified as the specified functional sections. In such a case, in this embodiment, the sum of the functional section recovery electric energies of the plurality of specified functional sections 400, 500 is obtained as the unit recovery electric energy for each of the cleaning units 100A, 100B. The unit recovery electric energy obtained in this way is an electric energy necessary to recover all the specified functional sections 400, 500 included in the cleaning unit 100A, 100B to the operating state, i.e. an electric energy necessary until the cleaning unit 100A, 100B as a collection of the functional sections reaches a state where the execution planned recipe can be executed. Thus, the unit recovery electric energy can be accurately grasped. Further, in the substrate processing apparatus 20 of this embodiment, the cleaning unit 100A having the smallest unit recovery electric energy is determined as the unit used for the execution of the execution planned recipe (Step S308). This enables the electric energy required to recover the cleaning unit 100 for the start of the execution planned recipe to be efficiently reduced.

Note that the procedure adopted in the second embodiment is such that the longest recovery time out of the unit recovery time and the functional section recovery times of the sections other than the cleaning units is first set as the apparatus recovery time (Step S305), the consumed electric energy of each specified functional section is calculated from the schedule determined based on this apparatus recovery time (Step 306) and the use planned unit is determined based on these consumed electric energies (Step S307). However, it is also possible to, after the use planned unit is first determined based on the unit recovery time, obtain the apparatus recovery time from the unit recovery time of the use planned unit and functional section recovery times of the sections other than the cleaning units and determine the schedule based on this apparatus recovery time.

Further, in the second embodiment, the consumed electric energy when a transition is made from a certain standby state to another standby state is calculated with reference to the average value of the maintain power in each standby state. However, after the consumed electric energy when a transition is made from a certain standby state to another standby state is actually measured, this consumed electric energy may be stored as a transitional electric energy consumed during a state transition in the database 62 in advance.

As just described, in the second embodiment, the recovery electric energy is obtained as the amount of resource, the unit recovery electric energy corresponds to an example of the "unit consumption amount" of the invention and the apparatus recovery electric energy corresponds to an example of the "apparatus consumption amount" of the invention.

Other Embodiments

The invention is not limited to the above embodiments and various changes other than the aforementioned ones can be made without departing from the gist thereof. For example, in the above embodiments, the resource consumption amounts of the specified functional sections 200, 300, 400 and 500 specified by the specifying operation (Step S202, 302) are used as a basis in selecting those to be used from the plurality of substrate processing apparatuses 20 and the plurality of cleaning units 100. However, the use application of the acquisition results of the resource consumption amounts required for the recovery of the specified functional sections is not limited to this and can be used for various managements associated with substrate processing. This point is described by way of specific examples.

Modification 1

In this modification 1, a configuration is described which adjusts a timing, at which the substrate processing apparatus 20 is caused to execute the execution planned recipe, based on the resource consumption amounts required for the recovery of the specified functional sections planned to be used in the execution planned recipe. That is, in this modification 1, the host computer 10 adjusts the start time of the execution planned recipe in executing the execution planned recipe in Step S500 (FIG. 9) described above. Various variations are thought as specific adjustment modes at this time.

For example, if the apparatus recovery time is obtained as the apparatus consumption amount, it can be predicted that the execution planned recipe can be executed in the corresponding substrate processing apparatus 20 at least at or after a recovery completion time reached upon the elapse of the apparatus recovery time after the start of the recovery. Accordingly, the host computer 10 sets an execution planning time of the execution planned recipe at or after the recovery completion time.

Alternatively, if the execution planning time of the execution planned recipe is specified such as in a production plan stored in the host computer 10, the host computer 10 may adjust this execution planning time according to the apparatus recovery time. That is, the execution planning time is advanced if it can be predicted from the apparatus recovery time obtained for the substrate processing apparatus 20 that the recovery of the substrate processing apparatus 20 is completed before the execution planning time. On the other hand, the execution planning time is delayed if it can be predicted that the recovery of the substrate processing apparatus 20 is completed after the execution planning time.

In such a configuration, the execution timing of the execution planned recipe is adjusted using the apparatus consumption amount (apparatus recovery time) as a judgment criterion. Thus, the execution planned recipe can be executed at a proper timing corresponding to the consumption amount of the resource (time) required for the start of the execution planned recipe.

Further, the host computer 10 may control recovery timings of the specified functional sections 200, 300, 400 and 500 used in the execution planned recipe according to the adjusted execution timing of the execution planned recipe. Various variations are thought also as specific control modes at this time.

For example, the start of the recovery of the specified functional section 200, 300, 400, 500 may be advanced if the start of the execution planned recipe is advanced, whereas the start of the recovery of the specified functional section 200, 300, 400, 500 may be delayed if the start of the execution planned recipe is delayed. By controlling the recovery timing of the specified functional section 200, 300, 400, 500 based on the execution timing in this way, the recovery of the specified functional section 200, 300, 400, 500 can be completed at a timing corresponding to the execution timing and a period from the completion of the recovery of the specified functional section 200, 300, 400, 500 to the start of the execution planned recipe, i.e. a standby period in the operating state where an energy consumption amount is large can be shortened.

Note that the timing control as described above can be executed by the apparatus controllers 50 of the substrate processing apparatuses 20 or may be executed by the host computer 10 or an apparatus different from the substrate processing apparatuses 20.

Modification 2

Alternatively, such as in the case of a plan to execute a plurality of execution planned recipes for a specific substrate processing apparatus 20, the next execution planned recipe may be determined out of the plurality of execution planned recipes based on a prediction result of the resource consumption amounts required for the recoveries of the specified functional sections planned to be used in the execution planned recipe. Specifically, the host computer 10 can determine the execution planned recipe to be executed next in the substrate processing apparatus 20 as a target out of the plurality of execution planned recipes based on the apparatus consumption amount (apparatus recovery time, apparatus recovery electric energy) obtained as in the above embodiments. Various variations are thought as selection criteria at this time.

For example, a control can be executed to execute the execution planned recipe predictable from the apparatus consumption amount to have a relatively small (smallest) consumption amount of resource (time, power, etc.) required for the start thereof next. Alternatively, if a timing at which the recipe can be started next is determined for another reason, a control can be executed to execute the execution planned recipe predictable from the apparatus recovery time that the recovery can be completed by that timing next out of the plurality of execution planned recipes. In such configurations, the execution planned recipe to be executed next is determined using the apparatus consumption amount corresponding to the execution planned recipe as a judgment criterion. Thus, the execution planned recipe proper in terms of the management of the resource consumption amount required for the start thereof can be determined to be executed next.

Note that the processing for determining the execution planned recipe as described above may be performed by the apparatus controllers 50 of the substrate processing apparatuses 20 or may be performed by the host computer 10 or an apparatus different from the substrate processing apparatuses 20.

Others

Further, the following changes can be made in the embodiments described above. For example, if there is a difference between the functional section recovery time predicted by the apparatus controller 50 of the substrate processing apparatus 20 and the recovery time actually required for the recovery of that functional section, the functional section recovery time obtained thereafter may be corrected based on the difference between these recovery times. Specifically, the apparatus controller 50 measures a time required for recovery from an arbitrary state to the operating state for each functional section and the functional section recovery time predicted thereafter may be corrected to be longer if the time actually required for the recovery of the functional section is longer than a predicted value of the functional section recovery time. This enables the functional section recovery time to be obtained in conformity with the previous actual time. Note that a target for such a correction is not limited to the functional section recovery time, and may be the unit recovery time or the apparatus recovery time or may be another resource consumption amount such as the functional section recovery electric energy, the unit recovery electric energy or the apparatus recovery electric energy.

As illustrated in the above embodiments, a plurality of functional sections 200, 300, 400 and 500 have to be recovered as a plurality of specified functional sections to execute an execution planned recipe in some cases. In such cases, timings at which the recoveries of these pluralities of specified functional sections are started can be arbitrarily set. Accordingly, a control may be, for example, so executed that all the specified functional sections have the same recovery completion time instead of simultaneously starting the recoveries of all the specified functional sections as described in the second embodiment. This can reduce the energy consumption amount by keeping the specified functional sections in the standby states for as long as possible. At that time, as described above, after a transition is made from a standby state where the energy consumption amount is large to a standby state where the energy consumption amount is small, the recovery from the standby state where the energy consumption amount is small to the operating state may be started.

The resource consumption amount such as the recovery time or the recovery electric energy may be calculated not by the apparatus controllers 50 of the substrate processing apparatuses 20, but by the host controller 11 of the host computer 10. Specifically, the host controller 11 may function as the "information acquisition device" of the invention. Further, it is also possible to cause the apparatus controller 50 of any one of the substrate processing apparatuses 20A, 20B and 20C to perform the determination processing of determining which apparatus is to execute the execution planned recipe. In this case, the apparatus controller 50 of the substrate processing apparatus 20 for performing the determination processing functions as the "control device" of the invention. Further, an apparatus fulfilling the function of at least one of the "information acquisition device" and the "control device" of the invention can be provided as an apparatus different from the host computer 10 and the substrate processing apparatuses 20.

In the above embodiments, only one unit for executing the execution planned recipe is selected from a plurality of processing units. However, there may be two or more processing units for performing substrate processing. In selecting two or more units, a preferential selection can be made from the one having a shortest unit recovery time or a smallest unit recovery electric energy. Similarly, although only one apparatus for performing the substrate processing is selected from the plurality of substrate processing apparatuses in the above embodiments, there may be two or more substrate processing apparatuses for performing substrate processing. In selecting two or more apparatuses, a preferential selection can be made from the one having a shortest apparatus recovery time or a smallest apparatus recovery electric energy can be preferentially selected.

Further, although the functional section recovery times and the functional section recovery electric energies are obtained based on the resource consumption amounts stored in the database 62 in the above embodiments, the database 62 is not an essential constituent element. For example, formulas for calculating the functional section recovery times and the functional section recovery electric energies may be stored in the storage section 60 and the functional section recovery times and the functional section recovery electric energies may be calculated using these formulas.

Further, although the apparatus recovery times and the substrate processing apparatus for executing the execution planned recipe are displayed on the display section 13 of the host computer 10 in the above embodiments, information other than these may be displayed on the display section 13. For example, the content of the database 62 shown in FIGS. 8A and 8B may be displayed or information such as the current state of each specified functional section may be displayed. Display sections may be provided on the substrate processing apparatuses 20 instead of or in addition to the display section 13 of the host computer 10.

Further, although the recovery times and the recovery electric energies are obtained as the resource consumption amounts in the above embodiments, it is also possible, for example, to obtain chemical and rinse liquid consumption amounts as the resource consumption amounts. Further, it is possible, for example, to obtain a plurality of resource consumption amounts and perform the determination processing based on the plurality of resource consumption amounts. For example, both the apparatus recovery time and the apparatus recovery electric energy are obtained for each substrate processing apparatus 20A, 20B, 20C and the apparatus having a smaller apparatus recovery electric energy may be caused to execute the execution planned recipe if the apparatus recovery times are equal.

Further, in the above embodiments, the substrate processing system 1 is illustrated which includes the plurality of substrate processing apparatuses 20. However, the invention can also be applied to a substrate processing system 1 including a single substrate processing apparatus 20. Further, in the above embodiments, the substrate processing apparatus 20 is illustrated which includes the plurality of cleaning units 100. However, the invention can also be applied to a substrate processing apparatus 20 including a single cleaning unit 100.

Here, in the substrate processing apparatus according to an aspect of the invention, a plurality of processing units each including the functional sections capable of performing the same assigned processing can be configured, the resource consumption amount acquisition section can obtain the resource consumption amounts of the specified functional sections specified by the specifying operation for each processing unit, and the controller can determine the processing unit used for the execution of the execution planned recipe out of the plurality of processing units based on the resource consumption amounts of the specified functional sections obtained for each processing unit by the resource consumption amount acquisition section. In the case of providing the plurality of processing units capable of performing the same processing for substrates in this way, it is necessary to determine which processing unit is to be caused to execute these processing. At that time, the processing unit proper in terms of the management of the resource consumption amounts required for the start of the execution planned recipe can be determined by using the resource consumption amounts of the specified functional sections capable of performing the assigned processing corresponding to the execution planned recipe as judgment criteria. At this time, the resource consumption amount acquisition section can obtain the resource consumption amounts required until the processing unit becomes usable for the execution of the execution planned recipe as the unit consumption amount for each processing unit based on the resource consumption amounts of the specified functional sections and the controller can determine the processing unit used for the execution of the execution planned recipe based on the unit consumption amount. Which processing unit is proper in terms of the management of the resource consumption amounts can be easily judged by obtaining the resource consumption amounts required until the processing unit becomes usable for each processing unit.

If the resource is time in this substrate processing apparatus, the resource consumption amount acquisition section can obtain the unit recovery time, which is a time required until the processing unit becomes usable for the execution of the execution planned recipe, as the unit consumption amount for each processing unit based on a result of obtaining the functional section recovery time, which is a time required to recover the specified functional section to the operating state, as the resource consumption amount of the specified functional section. Which processing unit is proper in terms of time management can be easily judged by obtaining the time required until the processing unit becomes usable as the unit recovery time for each processing unit in this way. Particularly, since the unit recovery time is obtained from the time required to recover the specified functional section capable of performing the assigned processing corresponding to the execution planned recipe to the operating state, the unit recovery time can be accurately obtained in conformity with the content of the execution planned recipe. As a result, time management associated with the substrate processing can be properly conducted.

At this time, if there is a plurality of specified functional sections for each processing unit, the resource consumption amount acquisition section can obtain the longest functional section recovery time out of the functional section recovery times of the plurality of specified functional sections of the processing unit as the unit recovery time for each processing unit. The unit recovery time obtained in this way is a time necessary to recover all the specified functional sections included in the processing unit to the operating state, i.e. a time necessary until the processing unit as a collection of the functional sections reaches a state where the execution planned recipe can be executed. This enables the unit recovery time to be accurately grasped. Further, the controller determines the use of the processing unit having the shortest unit recovery time for the execution of the execution planned recipe. This can effectively reduce the time required to recover the processing unit for the start of the execution planned recipe.

On the other hand, if the resource is power, the resource consumption amount acquisition section can obtain the unit recovery electric energy, which is an electric energy required until the processing unit becomes usable for the execution of the execution planned recipe, as the unit consumption amount for each processing unit based on a result of obtaining the functional section recovery electric energy, which is an electric energy required to recover the specified functional section to the operating state, as the resource consumption amount of the specified functional section. Which processing unit is proper in terms of electric energy management can be easily judged by obtaining the electric energy required until the processing unit becomes usable as the unit recovery electric energy in this way. Particularly, since the unit recovery electric energy is obtained from the electric energy required to recover the specified functional section capable of performing the assigned processing corresponding to the execution planned recipe to the operating state, the unit recovery electric energy can be accurately obtained in conformity with the content of the execution planned recipe. As a result, electric energy management associated with the substrate processing can be properly conducted.

At this time, if there is a plurality of specified functional sections for each processing unit, the resource consumption amount acquisition section can obtain the sum of the functional section recovery electric energies of the plurality of specified functional sections of the processing unit as the unit recovery electric energy for each processing unit. The unit recovery electric energy obtained in this way is the sum of the electric energies consumed to recover all the specified functional sections included in the processing unit to the operating state, i.e. an electric energy consumed until the processing unit as a collection of the functional sections reaches a state where the execution planned recipe can be executed. This enables the unit recovery electric energy to be accurately grasped. Further, the controller determines the use of the processing unit having the smallest unit recovery electric energy for the execution of the execution planned recipe. This can effectively reduce the electric energy required to recover the processing unit for the start of the execution planned recipe.

Further, in this substrate processing apparatus, the resource consumption amount acquisition section can specify a plurality of functional sections capable of being in charge of the assigned processing corresponding to the execution planned recipe from a plurality of functional sections, obtain the functional section recovery time, which is a time required to recover the specified functional section to the operating state, for each of the plurality of specified functional sections and determine the apparatus recovery time, which is a time required until the substrate processing apparatus becomes usable for the execution of the execution planned recipe, based on the functional section recovery time obtained for each of the plurality of specified functional sections, and the controller can determine the schedules of the recovery operations of the plurality of specified functional sections based on the apparatus recovery time and recover the plurality of specified functional sections to the operating state in accordance with the schedules. Each specified functional section can be reliably recovered to the operating state before the apparatus recovery time elapses by calculating the apparatus recovery time required until the substrate processing apparatus becomes usable for the execution of the execution planned recipe and setting the schedule of the recovery operation of each specified functional section based on this apparatus recovery time in this way.

At this time, the resource consumption amount acquisition section may obtain an electric energy required to recover the plurality of specified functional sections to the operating state in accordance with the schedules. According to such a configuration, management associated with substrate processing can be conducted, considering not only the time required in recovering the specified functional sections for the execution of the execution planned recipe, but also the electric energy required for recovery. Thus, it is possible not only merely to shorten the time up to the execution of the execution planned recipe, but also to reduce the electric energy to be consumed up to the recovery.

Further, the controller can adjust the execution timing of the execution planned recipe based on the resource consumption amount obtained for the specified functional section. In such a configuration, the execution timing of the execution planned recipe is adjusted, using the resource consumption amount of the specified functional section capable of performing the assigned processing corresponding to the execution planned recipe as a judgment criterion. Thus, the execution planned recipe can be executed at a proper timing corresponding to the resource consumption amount required for the start of the execution planned recipe. Further, the controller can control the recovery timing of the specified functional section used in the execution planned recipe based on the execution timing of the execution planned recipe. By controlling the recovery timing of the specified functional section based on the execution timing in this way, the recovery of the specified functional section can be completed at a timing corresponding to the execution timing and a period from the completion of the recovery of the specified functional section to the start of the execution planned recipe, i.e. a standby period in the standby state where an energy consumption amount is large can be shortened.

Further, in the substrate processing apparatus capable of executing a plurality of execution planned recipes, the controller can determine the execution planned recipe to be executed next out of the plurality of execution planned recipes based on the resource consumption amount of the specified functional section obtained by the resource consumption amount acquisition section and corresponding to the execution planned recipe. In such a configuration, the execution planned recipe to be executed next is determined, using the resource consumption amount of the specified functional section capable of performing the assigned processing corresponding to the execution planned recipe as a judgment criterion. Thus, it can be determined to execute the execution planned recipe proper in terms of the management of the resource consumption amount required for the start thereof next.

Further, based on the resource consumption amount obtained by the resource consumption amount acquisition section and necessary to recover the specified functional section to the operating state and the resource consumption amount actually consumed to recover the specified functional section to the operating state, the resource consumption amount acquisition section may adjust a value obtained as the resource consumption amount necessary to recover the specified functional section to the operating state thereafter. According to such a configuration, if there is a difference between the resource consumption amount obtained by the resource consumption amount acquisition section and the actual resource consumption amount, a value to be obtained thereafter can be corrected based on such a difference. As a result, when the resource consumption amount acquisition section obtains a resource consumption amount, the resource consumption amount in conformity with an actual value reflecting the previous actual resource consumption amount can be obtained.

Further, the database storing the resource consumption amount for each state of each functional section is provided and the resource consumption amount acquisition section can obtain the resource consumption amount necessary to recover the specified functional section to the operating state based on the database. By using the database storing the resource consumption amount for each state of each functional section, the resource consumption amount consumed until the functional section is recovered can be easily obtained, for example, only by adding the resource consumption amount in each state up to the recovery. Furthermore, even if the configuration of each functional section or the like is changed, the resource consumption amount can be accurately obtained only by appropriately updating data of the corresponding part.

Further, it is preferable if the functional section can be set in a plurality of standby states with different energy consumption amounts. By providing the plurality of standby states, it becomes possible to more finely control the state of the functional section. At this time, it is more preferable if the functional section can be set in the standby state in conformity with the content of the execution planned recipe out of the plurality of standby states. For example, an energy saving effect can be improved by causing the functional section, which needs not be set in the operating state according to the content of the execution planned recipe, to transition to a standby state where an energy consumption amount is smaller. On the other hand, by causing the functional section, which needs to be set in the operating state soon according to the content of the execution planned recipe, to transition to a standby state close to the operating state, the energy consumption amount can also be suppressed as much as possible without hindering smooth execution of the execution planned recipe.

A display section which displays the resource consumption amount obtained by the resource consumption amount acquisition section may be further provided. By providing such a display section, an operator can, for example, properly conduct management associated with substrate processing by referring to the resource consumption amount displayed on the display section.

Here, in the substrate processing system according to an aspect of the invention, the information acquisition device can obtain the apparatus consumption amount, which is a resource consumption amount required until the substrate processing apparatus becomes usable for the execution of the execution planned recipe, as a parameter based on the resource consumption amount of the specified functional section obtained for each substrate processing apparatus. Such a configuration enables the apparatus consumption amount, which is a resource consumption amount required until the substrate processing apparatus becomes usable for the execution of the execution planned recipe, to be obtained in conformity with the execution planned recipe and contributes to proper management of the substrate processing apparatus associated with the execution of the execution planned recipe. For example, a control device which determines the substrate processing apparatus for executing the execution planned recipe out of a plurality of substrate processing apparatuses based on the apparatus consumption amount obtained by the information acquisition device can be further provided. This can determine the use of the substrate processing apparatus proper in terms of the management of the resource consumption amount required for the start of the execution planned recipe for the execution of the execution planned recipe.

If the resource is time in this substrate processing system, the information acquisition device can obtain the apparatus recovery time, which is a time required until the substrate processing apparatus becomes usable for the execution of the execution planned recipe, as the apparatus consumption amount for each substrate processing apparatus based on a result of obtaining the functional section recovery time, which is a time required to recover the specified functional section to the operating state, as the resource consumption amount of the specified functional section. Which substrate processing apparatus is properly used in terms of time management can be easily judged by obtaining the time required until the substrate processing apparatus becomes usable as the apparatus recovery time for each substrate processing apparatus in this way. Particularly, since the apparatus recovery time is obtained from the time required to recover the specified functional section capable of performing the assigned processing corresponding to the execution planned recipe to the operating state, the apparatus recovery time can be accurately obtained in conformity with the content of the execution planned recipe. As a result, time management associated with the substrate processing can be properly conducted.

On the other hand, if the resource is power, the information acquisition device can obtain the apparatus recovery electric energy, which is an electric energy required until the substrate processing apparatus becomes usable for the execution of the execution planned recipe, as the apparatus consumption amount for each substrate processing apparatus based on a result of obtaining the functional section recovery electric energy, which is an electric energy required to recover the specified functional section to the operating state, as the resource consumption amount of the specified functional section. Which substrate processing apparatus is properly used in terms of electric energy management can be easily judged by obtaining the electric energy required until the substrate processing apparatus becomes usable as the apparatus recovery electric energy for each substrate processing apparatus in this way. Particularly, since the apparatus recovery electric energy is obtained from the electric energy required to recover the specified functional section capable of performing the assigned processing corresponding to the execution planned recipe to the operating state, the apparatus recovery electric energy can be accurately obtained in conformity with the content of the execution planned recipe. As a result, electric energy management associated with the substrate processing can be properly conducted.

Further, a control device may be further provided which adjusts the execution timing of the execution planned recipe in the substrate processing apparatus based on the apparatus consumption amount obtained by the information acquisition device. In such a configuration, the execution timing of the execution planned recipe is adjusted, using the apparatus consumption amount as a judgment criterion. Thus, the execution planned recipe can be executed at a proper timing corresponding to the resource consumption amount required for the start of the execution planned recipe.

Further, in the substrate processing system capable of executing a plurality of execution planned recipes, a control device may be further provided which determines the execution planned recipe to be executed next out of the plurality of execution planned recipes based on the apparatus consumption amount obtained by the information acquisition device and corresponding to the execution planned recipe. In such a configuration, the execution planned recipe to be executed next is determined, using the apparatus consumption amount corresponding to the execution planned recipe as a judgment criterion. Thus, it can be determined to execute the execution planned recipe proper in terms of the management of the resource consumption amount required for the start thereof next.

Further, a display device may be further provided which displays a parameter obtained by the information acquisition device. By providing such a display device, an operator can, for example, properly conduct management associated with substrate processing by referring to the parameter displayed on the display device.

This invention can be applied to a substrate processing apparatus, a substrate processing system and a control method for substrate processing apparatus for applying a processing to substrates in general including semiconductor wafers, glass substrates for photomask, glass substrates for liquid crystal display, glass substrates for plasma display, substrates for FED, substrates for optical discs, substrates for magnetic discs and substrates for magnetic optical discs, etc.

Although the invention has been described with reference to specific embodiments, this description is not meant to be construed in a limiting sense. Various modifications of the disclosed embodiment, as well as other embodiments of the present invention, will become apparent to persons skilled in the apparatus recovery time upon reference to the description of the invention. It is therefore contemplated that the appended claims will cover any such modifications or embodiments as fall within the true scope of the invention.

What is claimed is:

1. A substrate processing apparatus, comprising:
a plurality of functional sections each of which is selectively set in an operating state where an assigned processing thereof is executable on a substrate and a standby state where an energy consumption amount is less than in the operating state;
a controller which controls a state of each functional section between the operating state and the standby state and causes the functional section in charge of the assigned processing corresponding to a recipe to be set in the operating state and perform the assigned processing in executing the recipe specifying a processing procedure on the substrate; and
a resource consumption amount acquisition section which performs a specifying operation of specifying the functional section capable of being in charge of the assigned processing corresponding to an execution planned recipe out of the plurality of functional sections and obtains a resource consumption amount necessary to recover the specified functional section specified by the specifying operation to the operating state if the execution planned recipe, which is the recipe planned to be executed later, is given.

2. The substrate processing apparatus according to claim 1, wherein:
each of a plurality of processing units is configured to include the functional section capable of performing the same assigned processing;
the resource consumption amount acquisition section obtains the resource consumption amount of the specified functional section specified by the specifying operation for each processing unit; and
the controller determines the processing unit used for the execution of the execution planned recipe out of the plurality of processing units based on the resource consumption amount of the specified functional section obtained for the processing unit by the resource consumption amount acquisition section.

3. The substrate processing apparatus according to claim 2, wherein:
the resource consumption amount acquisition section obtains the resource consumption amount required until the processing unit becomes usable for the execution of the execution planned recipe as a unit consumption amount for each processing unit based on the resource consumption amount of the specified functional section; and
the controller determines the processing unit used for the execution of the execution planned recipe based on the unit consumption amounts.

4. The substrate processing apparatus according to claim 3, wherein the resource consumption amount acquisition section obtains a unit recovery time, which is a time required until the processing unit becomes usable for the execution of the execution planned recipe as the unit consumption amount for each processing unit based on a result of obtaining a functional section recovery time, which is a time required to recover the specified functional section to the operating state, as the resource consumption amount of the specified functional section.

5. The substrate processing apparatus according to claim 4, wherein the resource consumption amount acquisition section obtains the longest functional section recovery time out of the functional section recovery times of a plurality of the specified functional sections of the processing unit as the unit recovery time for each processing unit if there are the plurality of specified functional sections for each processing unit.

6. The substrate processing apparatus according to claim 4, wherein the controller determines the use of the processing unit having the shortest unit recovery time for the execution of the execution planned recipe.

7. The substrate processing apparatus according to claim 3, wherein the resource consumption amount acquisition section obtains a unit recovery electric energy, which is an electric energy required until the processing unit becomes usable for the execution of the execution planned recipe as the unit consumption amount for each processing unit based on a result of obtaining a functional section recovery electric energy, which is an electric energy required to recover the specified functional section to the operating state, as the resource consumption amount of the specified functional section.

8. The substrate processing apparatus according to claim 7, wherein the resource consumption amount acquisition section obtains the sum of the functional section recovery electric energies of a plurality of the specified functional sections of the processing unit as the unit recovery electric energy for each processing unit if there are the plurality of specified functional sections for each processing unit.

9. The substrate processing apparatus according to claim 7, wherein the controller determines the use of the processing unit having the smallest unit recovery electric energy for the execution of the execution planned recipe.

10. The substrate processing apparatus according to claim 1, wherein:
the resource consumption amount acquisition section specifies a plurality of the functional sections capable of being in charge of the assigned processing corresponding to the execution planned recipe from the plurality of functional sections, obtains a functional section recovery time, which is a time required to recover the specified functional section to the operating state for each of the plurality of specified functional sections, and determines an apparatus recovery time, which is a time required until the substrate processing apparatus becomes usable for the execution of the execution planned recipe, based on the functional section recovery time obtained for each of the plurality of specified functional sections; and
the controller determines a schedule of a recovery operation of the plurality of specified functional sections based on the apparatus recovery time and recovers the plurality of specified functional sections to the operating state in accordance with the schedule.

11. The substrate processing apparatus according to claim 10, wherein the resource consumption amount acquisition section obtains an electric energy required to recover the plurality of specified functional sections to the operating state in accordance with the schedule.

12. The substrate processing apparatus according to claim 1, wherein the controller adjusts an execution timing of the execution planned recipe based on the resource consumption amount obtained for the specified functional section.

13. The substrate processing apparatus according to claim 1, wherein the controller controls a recovery timing of the specified functional section used in the execution planned recipe based on an execution timing of the execution planned recipe.

14. The substrate processing apparatus according to claim 1 capable of executing a plurality of the execution planned recipes, wherein the controller determines the execution planned recipe to be executed next out of the plurality of execution planned recipes based on the resource consumption amount of the specified functional section obtained by the resource consumption amount acquisition section and corresponding to the execution planned recipe.

15. The substrate processing apparatus according to claim 1, wherein, based on the resource consumption amount obtained by the resource consumption amount acquisition section and necessary to recover the specified functional section to the operating state and the resource consumption amount actually consumed to recover the specified functional section to the operating state, the resource consumption amount acquisition section adjusts a value obtained as the resource consumption amount necessary to recover the specified functional section to the operating state thereafter.

16. The substrate processing apparatus according to claim 1, further comprising a database storing the resource consumption amount for each state of each functional section, wherein the resource consumption amount acquisition section obtains the resource consumption amount necessary to recover the specified functional section to the operating state based on the database.

17. The substrate processing apparatus according to claim 1, wherein the functional section is settable in a plurality of the standby states with different energy consumption amounts.

18. The substrate processing apparatus according to claim 17, wherein the functional section is settable in the standby state in conformity with the content of the execution planned recipe out of the plurality of standby states.

19. The substrate processing apparatus according to claim 1, further comprising a display section which displays the resource consumption amount obtained by the resource consumption amount acquisition section.

20. A substrate processing system with a plurality of substrate processing apparatuses, comprising:
an information acquisition device which obtains a parameter used for a control of the plurality of substrate processing apparatuses, wherein:

each of the substrate processing apparatuses includes:
- a plurality of functional sections each of which is selectively set in an operating state where an assigned processing thereof is executable on a substrate and a standby state where an energy consumption amount is less than in the operating state, and
- a controller which controls a state of each functional section between the operating state and the standby state and causes the functional section in charge of the assigned processing corresponding to a recipe to be set in the operating state and perform the assigned processing in executing the recipe specifying a processing procedure on the substrate; and the information acquisition device performs a specifying operation of specifying the functional section capable of being in charge of the assigned processing corresponding to an execution planned recipe, which is the recipe to be executed later, out of the plurality of functional sections, and obtains a resource consumption amount necessary to recover the specified functional section specified by the specifying operation to the operating state as the parameter for each substrate processing apparatus.

21. The substrate processing system according to claim 20, wherein the information acquisition device obtains an apparatus consumption amount, which is the resource consumption amount required until the substrate processing apparatus becomes usable for the execution of the execution planned recipe, as the parameter based on the resource consumption amount of the specified functional section obtained for each substrate processing apparatus.

22. The substrate processing system according to claim 21, further comprising a control device which determines the substrate processing apparatus for executing the execution planned recipe out of the plurality of substrate processing apparatuses based on the apparatus consumption amount obtained by the information acquisition device.

23. The substrate processing system according to claim 21, wherein the information acquisition device obtains an apparatus recovery time, which is a time required until the substrate processing apparatus becomes usable for the execution of the execution planned recipe, as the apparatus consumption amount for each substrate processing apparatus based on a result of obtaining a functional section recovery time, which is a time required to recover the specified functional section to the operating state, as the resource consumption amount of the specified functional section.

24. The substrate processing system according to claim 21, wherein the information acquisition device obtains an apparatus recovery electric energy, which is an electric energy required until the substrate processing apparatus becomes usable for the execution of the execution planned recipe, as the apparatus consumption amount for each substrate processing apparatus based on a result of obtaining a functional section recovery electric energy, which is an electric energy required to recover the specified functional section to the operating state, as the resource consumption amount of the specified functional section.

25. The substrate processing system according to claim 21, further comprising a control device which adjusts an execution timing of the execution planned recipe in the substrate processing apparatus based on the apparatus consumption amount obtained by the information acquisition device.

26. The substrate processing system according to claim 21 capable of executing a plurality of execution planned recipes, further comprising a control device which determines the execution planned recipe to be executed next out of the plurality of execution planned recipes based on the apparatus consumption amount obtained by the information acquisition device and corresponding to the execution planned recipe.

27. The substrate processing system according to claim 20, further comprising a display device which displays the parameter obtained by the information acquisition device.

28. A control method for a substrate processing apparatus which includes a plurality of functional sections each of which is selectively set in an operating state where an assigned processing thereof is executable on a substrate and a standby state where an energy consumption amount is less than in the operating state and selects a state of each functional section between the operating state and the standby state, comprising:
- reading a recipe specifying a processing procedure on the substrate;
- performing a specifying operation of specifying the functional section capable of being in charge of the assigned processing corresponding to an execution planned recipe out of the plurality of functional sections if the execution planned recipe, which is the recipe planned to be executed later, is given; and
- obtaining a resource consumption amount necessary to recover the specified functional section specified by the specifying operation to the operating state.

29. A computer-readable non-transitory storage medium storing a program to be executed by a computer of a substrate processing apparatus which includes a plurality of functional sections each of which is selectively set in an operating state where an assigned processing thereof is executable on a substrate and a standby state where an energy consumption amount is less than in the operating state and selects a state of each functional section between the operating state and the standby state, the program causing the computer to perform:
- reading a recipe specifying a processing procedure on the substrate;
- performing a specifying operation of specifying the functional section capable of being in charge of the assigned processing corresponding to an execution planned recipe out of the plurality of functional sections if the execution planned recipe, which is the recipe planned to be executed later, is given; and
- obtaining a resource consumption amount necessary to recover the specified functional section specified by the specifying operation to the operating state.

* * * * *